(12) United States Patent
Cherry et al.

(10) Patent No.: US 11,901,570 B2
(45) Date of Patent: Feb. 13, 2024

(54) BATTERY PACK

(71) Applicant: Black & Decker Inc., Newark, DE (US)

(72) Inventors: Mark Cherry, White Marsh, MD (US); Timothy J. Hennesy, Baltimore, MD (US); Michael W. Roberts, Red Lion, PA (US); Michael Varipatis, Fallston, MD (US)

(73) Assignee: BLACK & DECKER INC., Newark, DE (US)

( * ) Notice: Subject to any disclaimer, the term of this patent is extended or adjusted under 35 U.S.C. 154(b) by 180 days.

(21) Appl. No.: 16/948,307

(22) Filed: Sep. 11, 2020

(65) Prior Publication Data
US 2021/0083237 A1 Mar. 18, 2021

Related U.S. Application Data

(60) Provisional application No. 62/900,822, filed on Sep. 16, 2019.

(51) Int. Cl.
| | |
|---|---|
| *H01M 50/20* | (2021.01) |
| *H01M 50/24* | (2021.01) |
| *B25F 5/02* | (2006.01) |

(52) U.S. Cl.
CPC .............. *H01M 50/20* (2021.01); *B25F 5/02* (2013.01); *H01M 50/24* (2021.01); *H01M 2220/30* (2013.01)

(58) Field of Classification Search
CPC .. H01M 50/20; H01M 50/24; H01M 2220/30; H01M 50/247; H01M 50/204; B25F 5/02; Y02E 60/10
See application file for complete search history.

(56) References Cited

U.S. PATENT DOCUMENTS

| | | | |
|---|---|---|---|
| 5,040,627 | A | 8/1991 | Swayze |
| 5,881,823 | A | 3/1999 | Kabatnik et al. |
| (Continued) | | | |

FOREIGN PATENT DOCUMENTS

| | | | | |
|---|---|---|---|---|
| CA | 1304778 | C | 7/1992 | |
| CN | 103802075 | * | 5/2014 | ............... B25F 5/00 |
| (Continued) | | | | |

OTHER PUBLICATIONS

Extended European Search Report, EP Application No. 20196083.8, dated Ja. 29, 2021, 10 pages, EPO.

(Continued)

*Primary Examiner* — Michael L Dignan
(74) *Attorney, Agent, or Firm* — Michael Aronoff

(57) ABSTRACT

A battery pack includes a housing, a set of battery cells, and a latch assembly mechanism. The latch assembly mechanism includes a user activation button that pivots about a first axis and an engaging portion that pivots about a second axis, where the first axis is parallel to the second axis and the user activation button actuates the engaging portion. In another aspect, a battery pack includes a housing and a set of battery cells. The housing includes a top portion, a first side portion connected to the top portion, a second side portion connected to the top portion, the second side portion opposite the first side portion, and a bottom portion connected to the first side portion and the second side portion, the bottom portion opposite the top portion. An insert is molded into at least one of the first side portion and the second side portion.

13 Claims, 28 Drawing Sheets

(56) References Cited

U.S. PATENT DOCUMENTS

| | | | |
|---|---|---|---|
| 6,168,881 B1* | 1/2001 | Fischer | B25F 5/02 |
| | | | 429/97 |
| 7,648,795 B2 | 1/2010 | Nagai et al. | |
| 9,406,915 B2 | 8/2016 | White et al. | |
| 10,249,854 B2 | 4/2019 | Beyerl et al. | |
| 10,483,506 B2 | 11/2019 | Klee et al. | |
| 2011/0036654 A1 | 2/2011 | Rinderlin et al. | |
| 2011/0116861 A1* | 5/2011 | Zhang | H01M 50/209 |
| | | | 403/322.1 |
| 2012/0256590 A1* | 10/2012 | Hamano | H01M 50/244 |
| | | | 320/112 |
| 2013/0202926 A1 | 8/2013 | Yoon | |
| 2014/0349143 A1* | 11/2014 | Ogura | H01M 10/6556 |
| | | | 429/7 |
| 2015/0104250 A1 | 4/2015 | Tada et al. | |
| 2016/0020443 A1 | 1/2016 | White et al. | |
| 2016/0293912 A1* | 10/2016 | Manion | B25F 5/02 |
| 2016/0359151 A1 | 12/2016 | Beyerl et al. | |
| 2017/0025650 A1* | 1/2017 | Altenburger | H01M 50/247 |
| 2017/0271632 A1 | 9/2017 | Jenkins et al. | |
| 2017/0352850 A1 | 12/2017 | Nagane et al. | |
| 2017/0373288 A1 | 12/2017 | Klee et al. | |
| 2018/0169851 A1* | 6/2018 | Radovich | B25F 5/02 |
| 2018/0331335 A1 | 11/2018 | Klee et al. | |
| 2018/0358589 A1 | 12/2018 | Beyerl et al. | |
| 2019/0044112 A1 | 2/2019 | Klee et al. | |
| 2019/0198828 A1* | 6/2019 | Zanon | H01M 50/24 |
| 2020/0052257 A1* | 2/2020 | Stanton | H01M 50/271 |
| 2020/0274116 A1* | 8/2020 | Warren | H01M 50/244 |

FOREIGN PATENT DOCUMENTS

| | | | | |
|---|---|---|---|---|
| EP | 2390941 A1 | 11/2011 | | |
| EP | 3188279 A1 | 7/2017 | | |
| GB | 2352003 A | 1/2001 | | |
| GB | 2431433 | * 10/2006 | | B25F 5/02 |
| JP | 2001229895 A | 8/2001 | | |
| JP | 2002117815 A | 4/2002 | | |
| JP | 2013161792 A | 8/2013 | | |

OTHER PUBLICATIONS

Extended European Search Report, EP Application No. 20196084.6, dated Jan. 29, 2021, 9 pages, EPO.

* cited by examiner

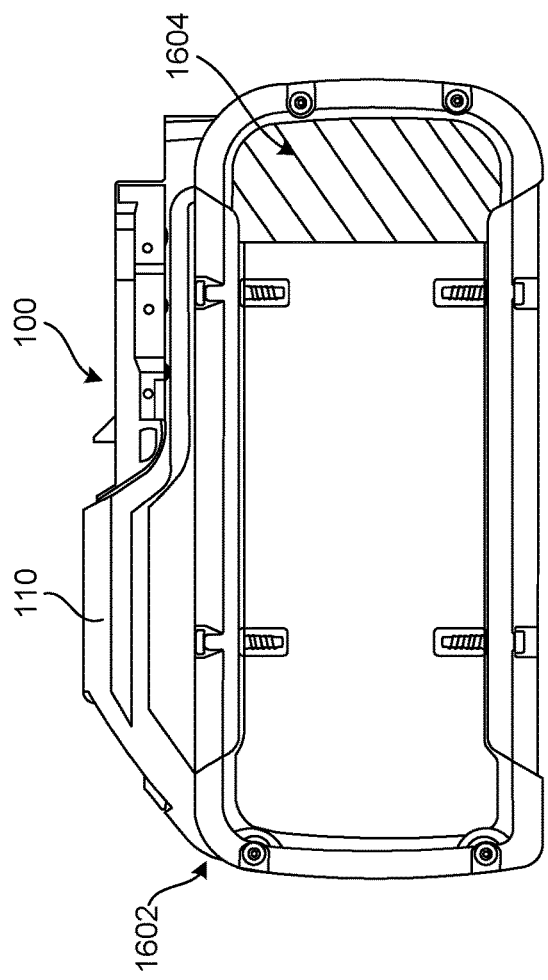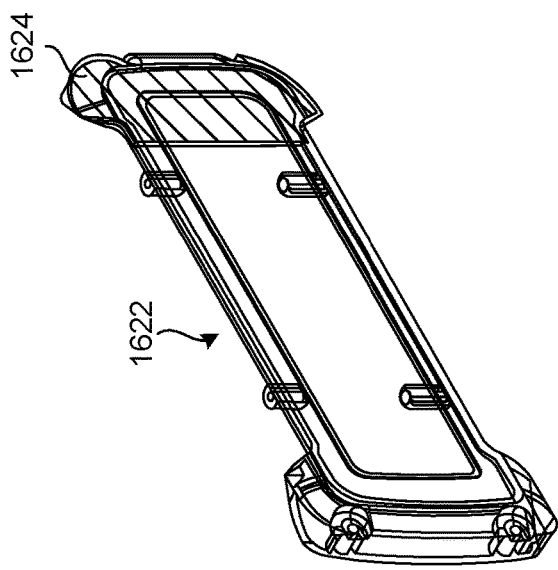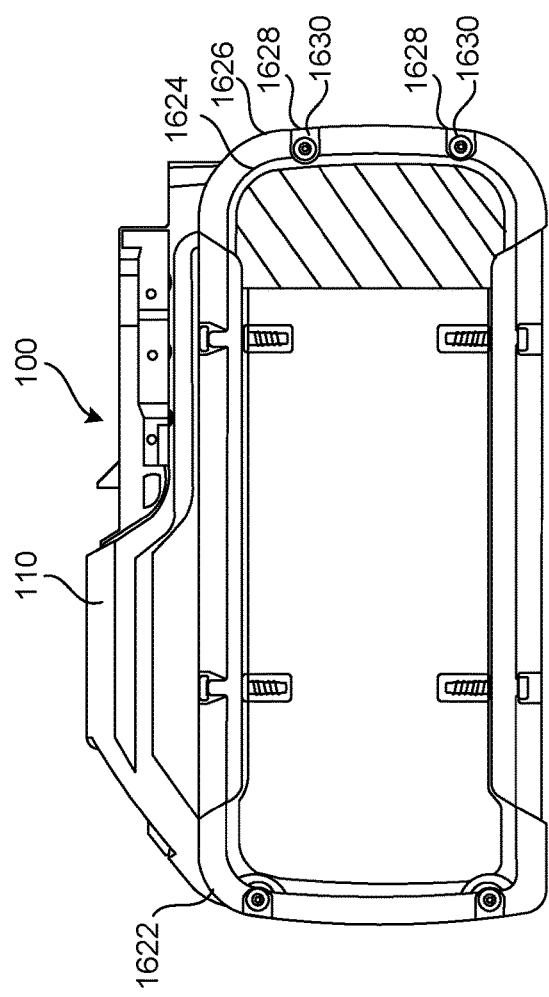

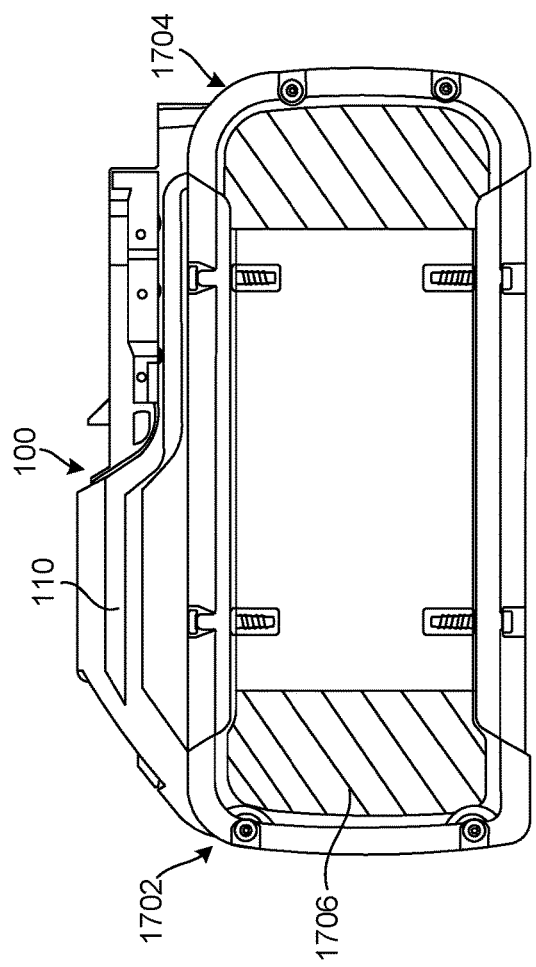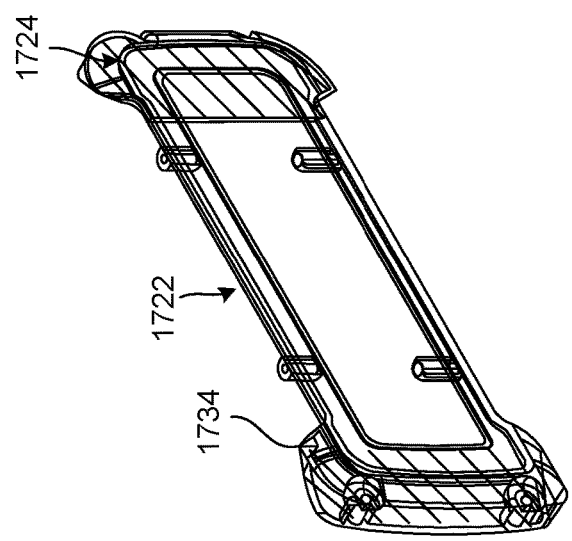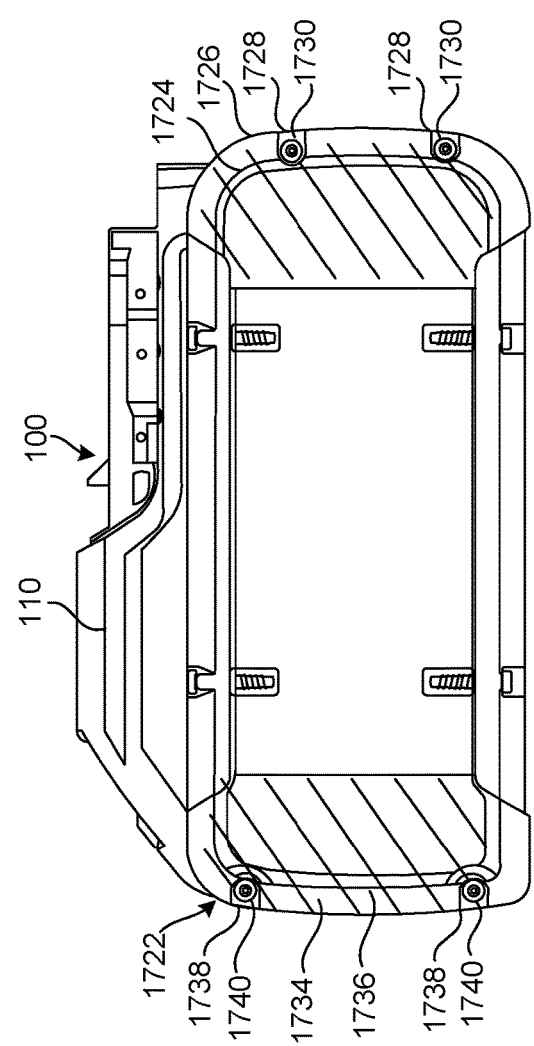

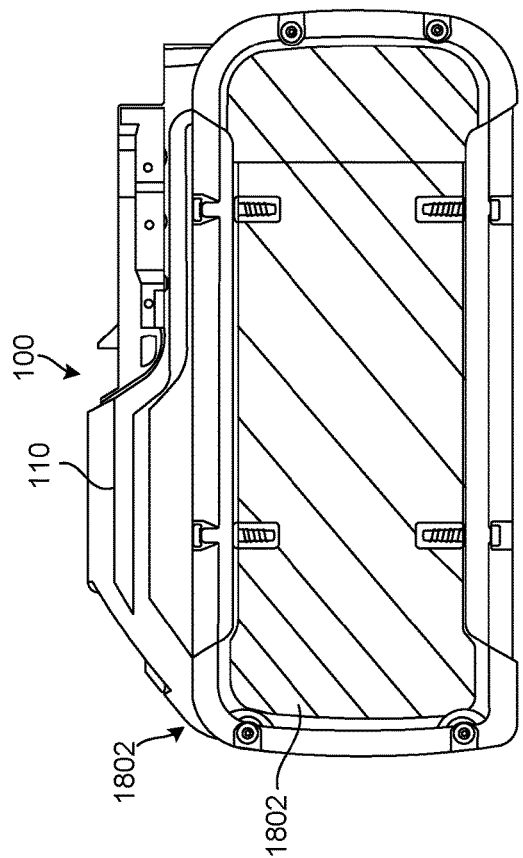
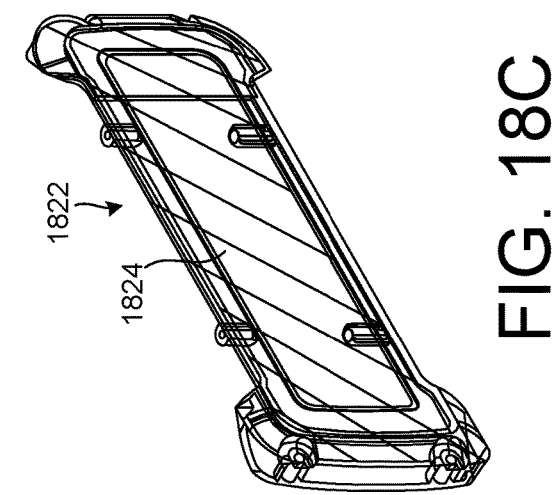
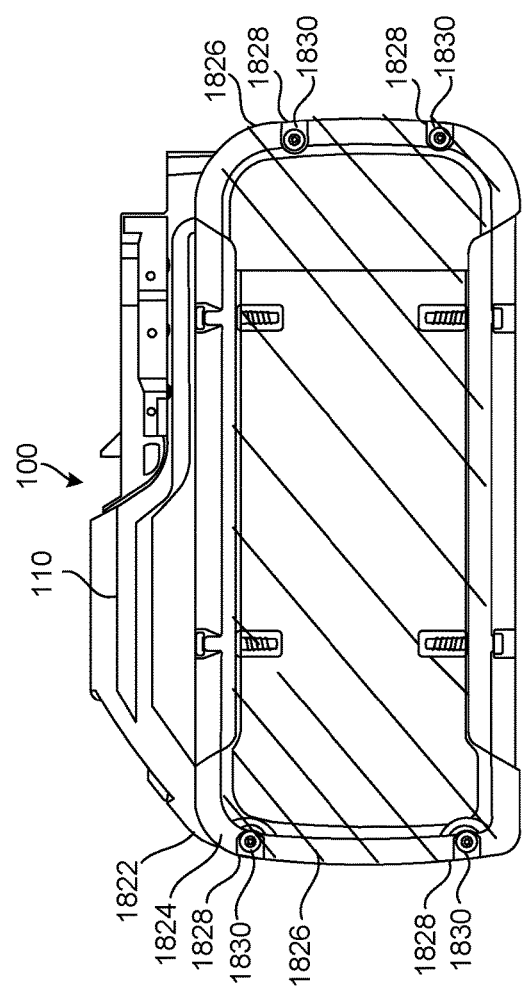
FIG. 18A
FIG. 18B
FIG. 18C

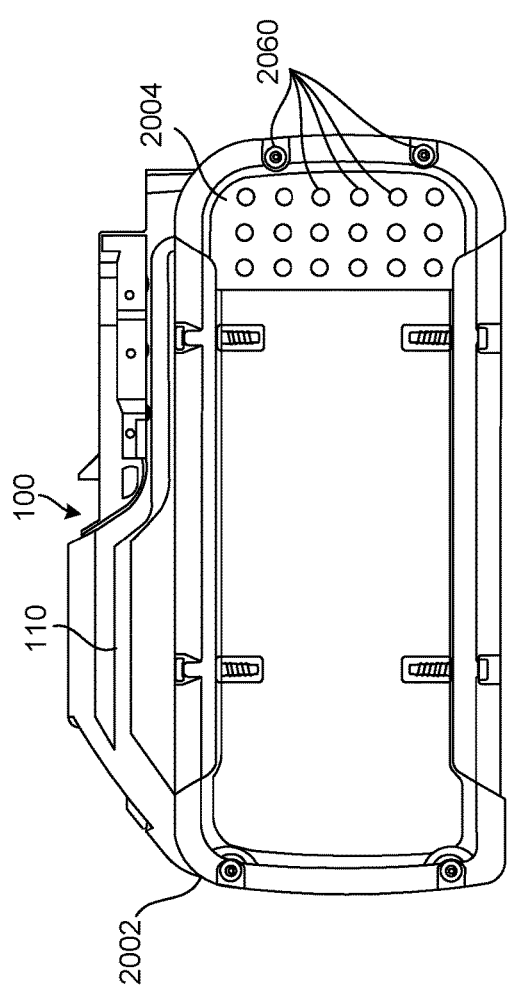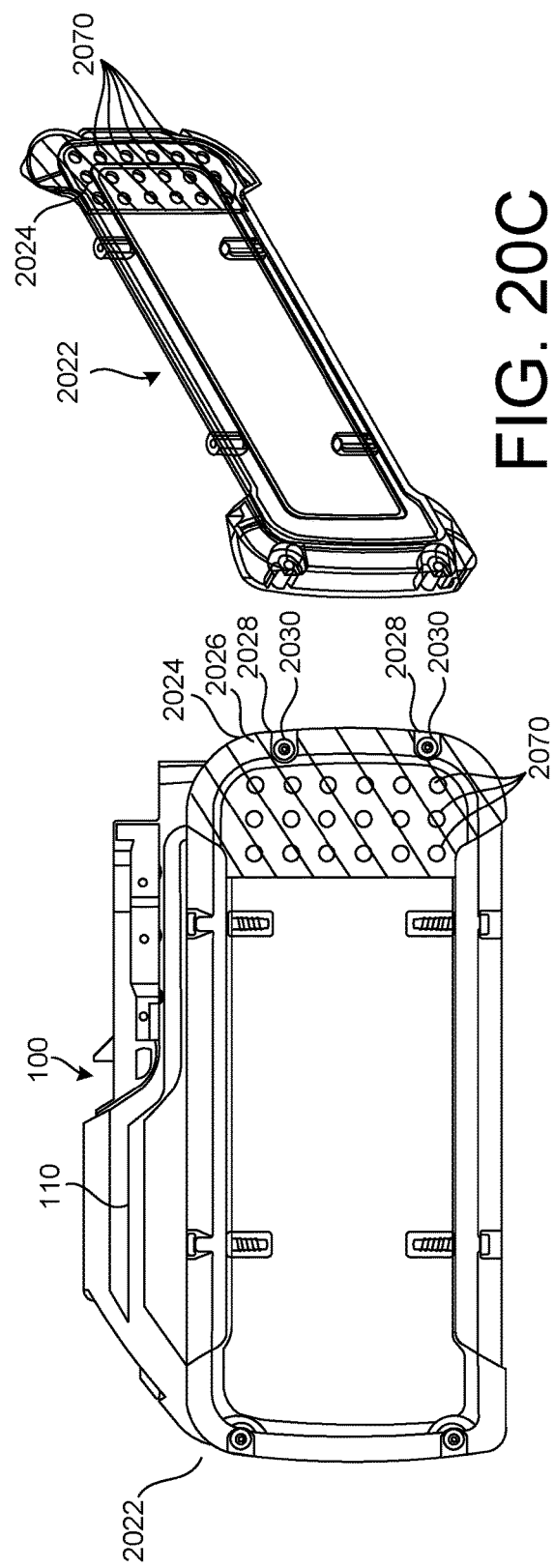

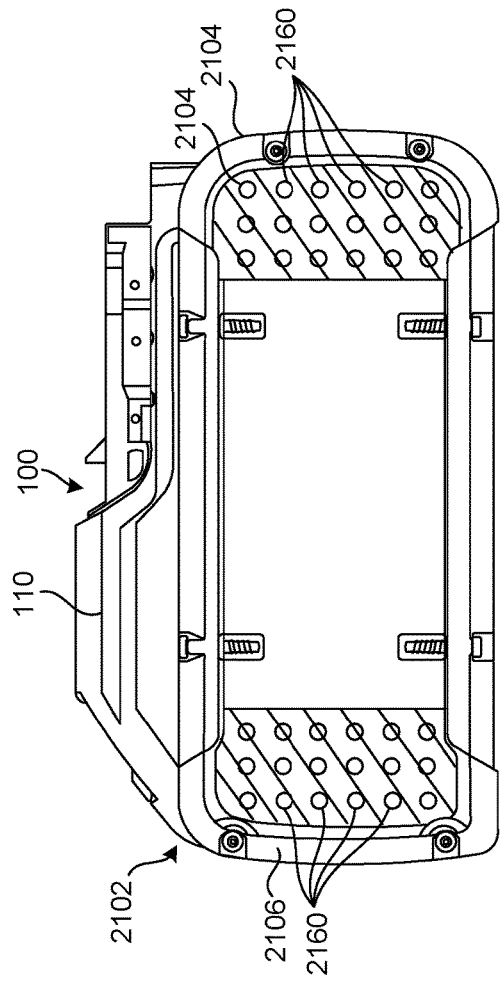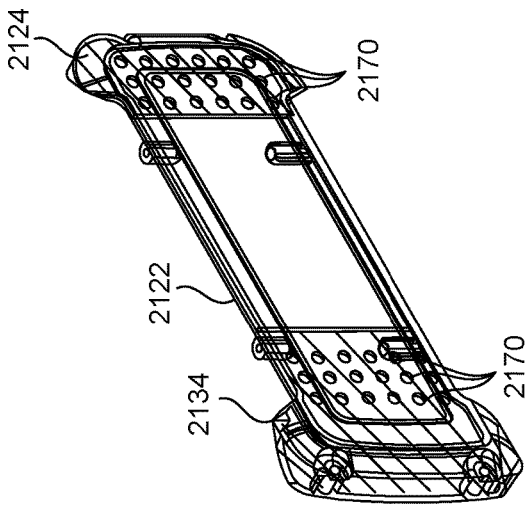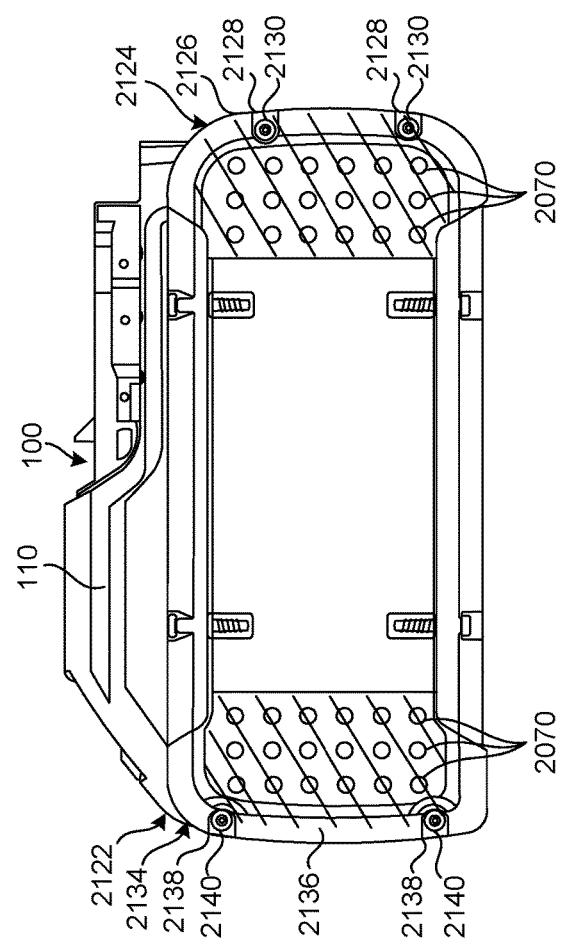

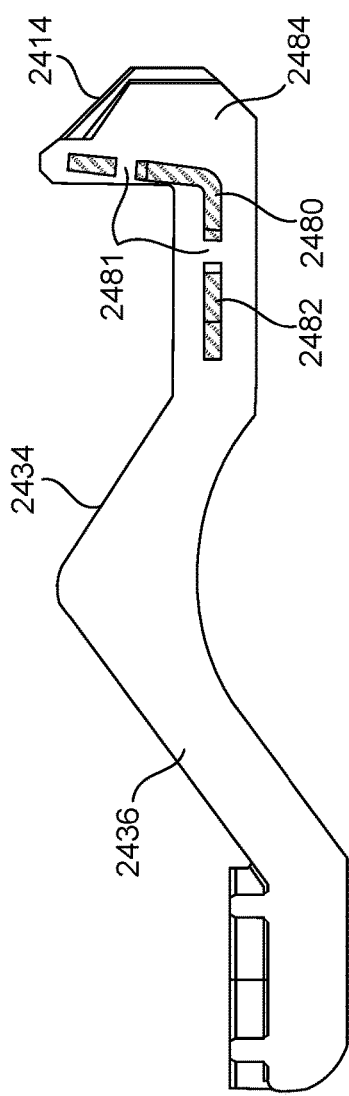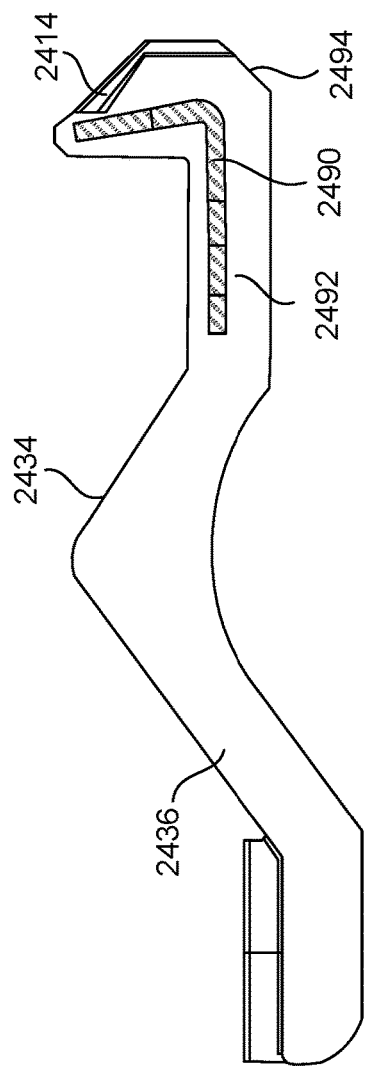

BATTERY PACK

CROSS-REFERENCE TO RELATED APPLICATION

This application claims the benefit of and priority to U.S. Provisional Application No. 62/900,822, filed Sep. 16, 2019, which is incorporated by reference herein in its entirety.

TECHNICAL FIELD

This description relates, generally, to a battery pack, and in particular to a battery pack latch and latching system. This description also relates in particular to a battery pack having support inserts in the plastic battery pack components.

BACKGROUND

Battery packs include multiple battery cells to provide power to portable equipment including tools, radios, and other devices. The battery packs are removable from the equipment so the battery pack can be recharged. Battery packs having different sizes may be compatible with multiple, different types of equipment. As battery pack sizes increase, particularly in the length (insertion) direction to accommodate more battery cells and higher energy storage, the location available for a user activation button of a latch assembly mechanism begins to move further away from an engaging portion (also referred to as a hook) of the latch assembly mechanism in order to keep the engaging portion in a same location relative to a catch/receiving portion of the equipment for equipment compatibility purposes. The size increase in the battery pack and changing location of the latch assembly mechanism components may lead to less stable and reliable latch assembly mechanism operation because the forces involved to activate the latch engaging portion start to spread further apart making pure vertical motion of the engaging portion more difficult to operate. These changes may result in other issues including user dissatisfaction with the feel and operation of the latch assembly mechanism and instances when the battery pack cannot be disengaged from the equipment.

The battery pack housing may be made of material such as, for example, plastic. Due to the thickness of the housing material, internal battery pack components may be exposed or damaged by events to the battery pack such as impacts, drops and vibration. In some battery packs, the size of the battery cells have increased or it is desirable to be able to accommodate larger battery cells, that are available for use or become available for use, using the same size battery pack. That is, it is desirable to maintain the size of the battery pack so that the battery pack is compatible with existing equipment and tools in the marketplace. To accommodate the use of larger battery cells within the same size battery pack, the overall thickness of the battery pack housing in certain places has been reduced. For example, the thickness of the sides of the battery pack housing and/or the thickness of the bottom of the battery pack housing has been reduced to accommodate or to be able to accommodate larger battery cells in the interior of the battery pack. Since the sides of the battery pack housing and the bottom of the battery pack housing are typically made of plastic, the reduced thickness of the plastic may result in a reduced strength of the battery pack housing. A reduced-strength battery pack housing may be more susceptible to damage than the battery packs with thicker housing components when the battery pack is exposed or damaged by events to the battery pack, as described above. A technical solution is desired to strengthen the battery pack housing, as well as other battery pack components to reduce the risk of exposing and damaging the battery pack internal components and the battery pack itself.

A battery pack may include battery cells that are oriented such that the ends of the battery cells are facing the side covers of the battery pack housing—horizontally for purpose of this application. A battery pack may include battery cells that are oriented such that the one end of the battery cells is facing the top enclosure of the housing and one end of the battery cells is facing the bottom enclosure of the housing—vertically for purposes of this application. When the battery cells are oriented in a horizontal direction water and/or other contaminants may become trapped between plastic components of the battery housing (e.g., an end cap and a battery cell holder) and a flexible printed circuit board, which electrically connects the battery cells to a printed circuit board. When two battery cells are at different voltages, their voltage differential combined with contamination (e.g., water and/or other contaminants) may cause undesirable electrical shorting between the battery cells. This can drain the cells or may form a corrosion bridge between the otherwise separated battery cells. The corrosion bridge may cause unwanted shorting between the battery cells as well as other potential undesirable events caused by the current path between the battery cells through the corrosion bridge. It is desirable to prevent contamination from causing electrical shorts and from forming corrosion bridges between the battery cells.

SUMMARY

According to one general aspect, a battery pack includes a housing, a set of battery cells disposed in the housing, and a latch assembly mechanism. The latch assembly mechanism includes a user activation button that pivots about a first axis and an engaging portion that pivots about a second axis, where the first axis is parallel to the second axis and the user activation button actuates the engaging portion.

Implementations may include one or more of the following features. For example, in some implementations, the battery pack may include a spring disposed on a flat surface of the engaging portion. In some implementations, the battery pack may include a spring disposed between the engaging portion and an inside surface of a top of the housing. In some implementations, the battery pack includes a spring disposed between a spring support and a bottom surface of a flat portion of the engaging portion.

In another general aspect, a battery pack includes a housing, a set of battery cells disposed in the housing, and a multi-part latch assembly mechanism operable to mate and unmate the housing from a piece of equipment.

Implementations may include one or more of the following features. For example, the multi-part latch assembly includes a first part of the latch assembly mechanism that pivots about a first axis and a second part of the latch assembly mechanism that pivots about a second axis, where the first axis is parallel to the second axis. The first part of the latch assembly mechanism may include a user activation button, a button extension, and a button extension arm. The second part of the latch assembly mechanism may include an engaging portion, a latch extension, and a latch extension arm, where the button extension arm interfaces with the latch extension arm and the user activation button actuates the engaging portion through the button extension arm interfacing with the latch extension arm.

In some implementations, the battery pack further includes a spring disposed on a flat surface of the engaging portion. In some implementations, the battery pack includes a spring disposed between the engaging portion and an inside surface of a top of the housing. In some implementations, the battery pack includes a spring disposed between a spring support and a bottom surface of a flat portion of the engaging portion.

In some implementations, the battery pack may include a button pivot support, where the button extension arm includes a button pivot shoulder that is disposed on the button pivot support and the button pivot shoulder provides a rotation point for the first axis. The battery pack may include a latch pivot support, where the latch extension arm includes a latch pivot shoulder that is disposed on the latch pivot support and the latch pivot shoulder provides a rotation point for the second axis.

In another general aspect, a battery pack includes a housing and a set of battery cells disposed in the housing. The housing includes a top portion, a first side portion connected to the top portion, a second side portion connected to the top portion, the second side portion opposite the first side portion, and a bottom portion connected to the first side portion and the second side portion, the bottom portion opposite the top portion. An insert is molded into at least one of the first side portion and the second side portion.

Implementations may include one or more of the following features. For example, the insert may be a metal material. In some implementations, the insert may be a plastic material. In some implementations, the insert may be a carbon fiber material.

In some implementations, a first insert may be molded into the first side portion and a second insert may be molded into the second side portion. In some implementations, a first insert may be molded into the first side portion, a second insert may be molded into the second side portion, and a third insert may be molded into the bottom portion. In some implementations, the first insert includes a single piece and the second insert includes a single piece. In some implementations, the first insert includes two pieces and the second insert includes two pieces. In some implementations, at least a portion of the first insert is exposed to an outer surface of the first side portion and at least a portion of the second insert is exposed to an outer surface of the second side portion. In some implementations, the first insert includes multiple holes and the second insert includes multiple holes.

In some implementations, the first insert is fully encapsulated by plastic of the first side portion and the second insert is fully encapsulated by plastic of the second side portion.

The battery pack includes a latch assembly mechanism and the latch assembly mechanism includes an engaging portion with a latch insert molded into the engaging portion. In some implementations, the latch insert includes a first portion and a second portion that form an L-shape. In some implementations, the latch insert includes at least a portion that is exposed on an outside of the user engaging portion. In some implementations, the latch insert is a metal latch insert. In some implementations, the latch insert is a steel latch insert.

The details of one or more implementations are set forth in the accompanying drawings and the description below. Other features will be apparent from the description and drawings, and from the claims.

BRIEF DESCRIPTION OF THE DRAWINGS

FIG. 16A is a side view of the battery pack of FIG. 1 illustrating a transparent view of the side cover of the battery pack with one insert.
FIG. 16B is a side view of the battery pack of FIG. 1 illustrating a transparent view of an alternate example embodiment of a side cover of the battery pack with one insert wrapping around an edge.
FIG. 16C is a perspective view of the side cover of the of the battery pack of FIG. 16B.
FIG. 17A is a side view of the battery pack of FIG. 1 illustrating a transparent view of an alternate example embodiment of a side cover of the battery pack with two inserts.
FIG. 17B is a side view of the battery pack of FIG. 1 illustrating a transparent view of an alternate example embodiment of a side cover of the battery pack with two inserts wrapping around an edge.
FIG. 17C is a perspective view of the side cover of the of the battery pack of FIG. 17B.
FIG. 18A is a side view of the battery pack of FIG. 1 illustrating a transparent view of an alternate example embodiment of a side cover of the battery pack with one insert.
FIG. 18B is a side view of the battery pack of FIG. 1 illustrating a transparent view of an alternate example embodiment of a side cover of the battery pack with one insert wrapping around an edge.
FIG. 18C is a perspective view of the side cover of the of the battery pack of FIG. 18B.

FIG. 20A is a side view of the battery pack of FIG. 1 illustrating a transparent view of an alternate example embodiment of a side cover of the battery pack with one insert having holes.

FIG. 20B is a side view of the battery pack of FIG. 1 illustrating a transparent view of an alternate example embodiment of a side cover of the battery pack with one insert having holes wrapping around an edge.

FIG. 20C is a perspective view of the side cover of the of the battery pack of FIG. 20B.

FIG. 21A is a side view of the battery pack of FIG. 1 illustrating a transparent view of an alternate example embodiment of a side cover of the battery pack with two inserts having holes.

FIG. 21B is a side view of the battery pack of FIG. 1 illustrating a transparent view of an alternate example embodiment of a side cover of the battery pack with two inserts having holes wrapping around an edge.

FIG. 21C is a perspective view of the side cover of the of the battery pack of FIG. 21B.

FIG. 24A is a side view of an alternate example embodiment of an engaging portion of the latch assembly mechanism having an insert.

FIG. 24B is a side view of an alternate example embodiment of an engaging portion of the latch assembly mechanism having an insert with an angle.

DETAILED DESCRIPTION

Figure 1:
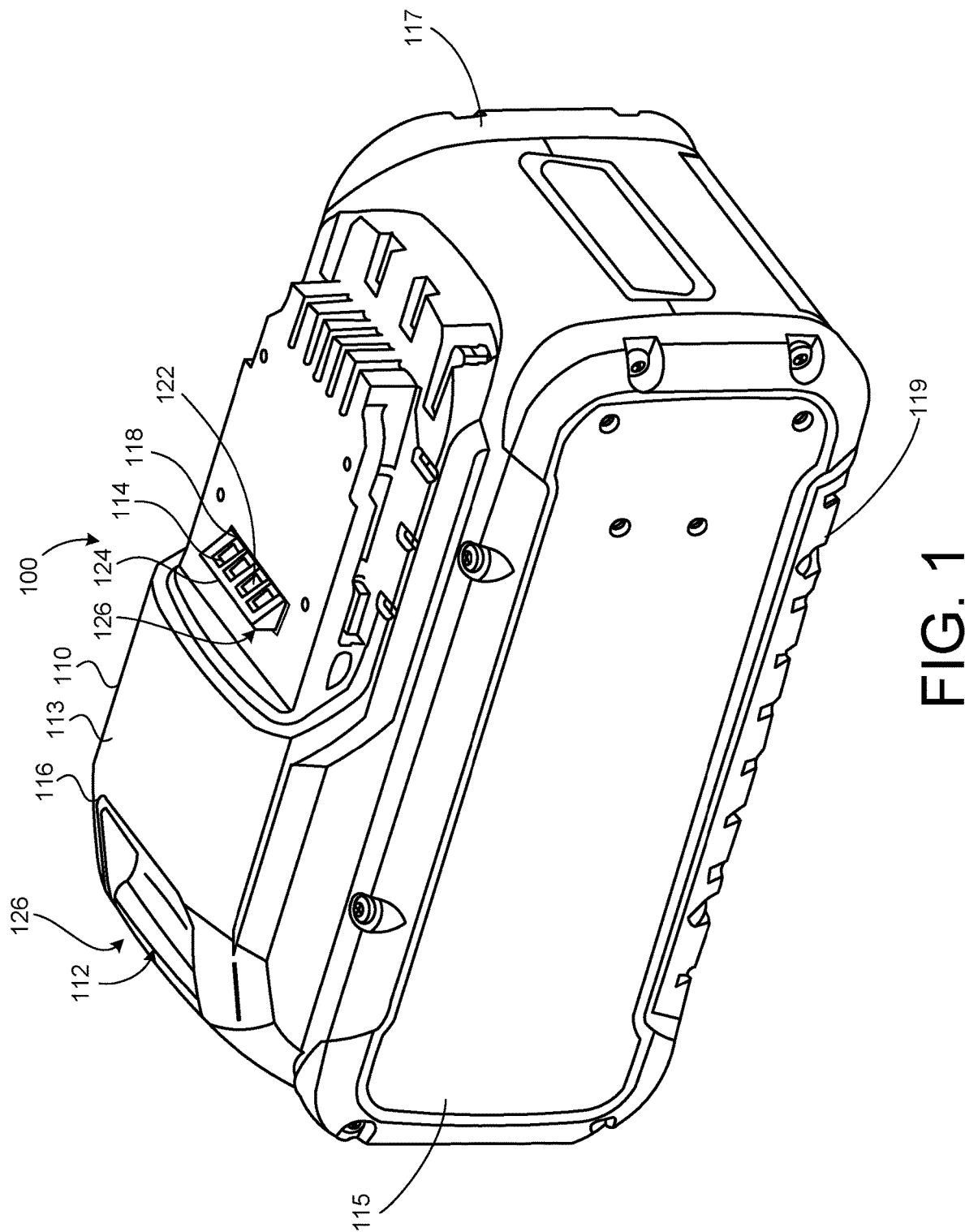
FIG. 1 is a perspective view of an example battery pack.
Figure 2:
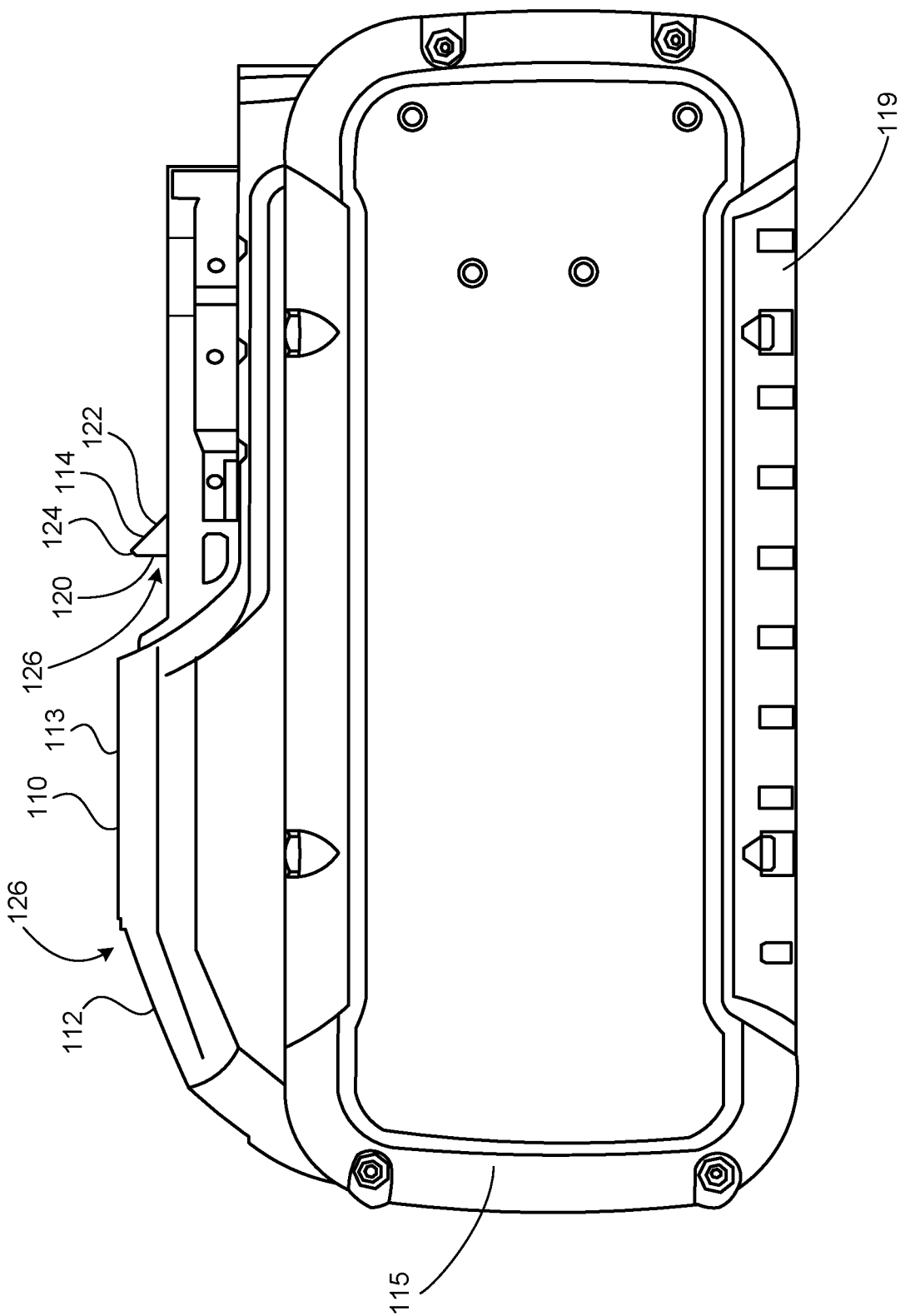
FIG. 2 is a is a side view of the battery pack of FIG. 1.
Figure 3:
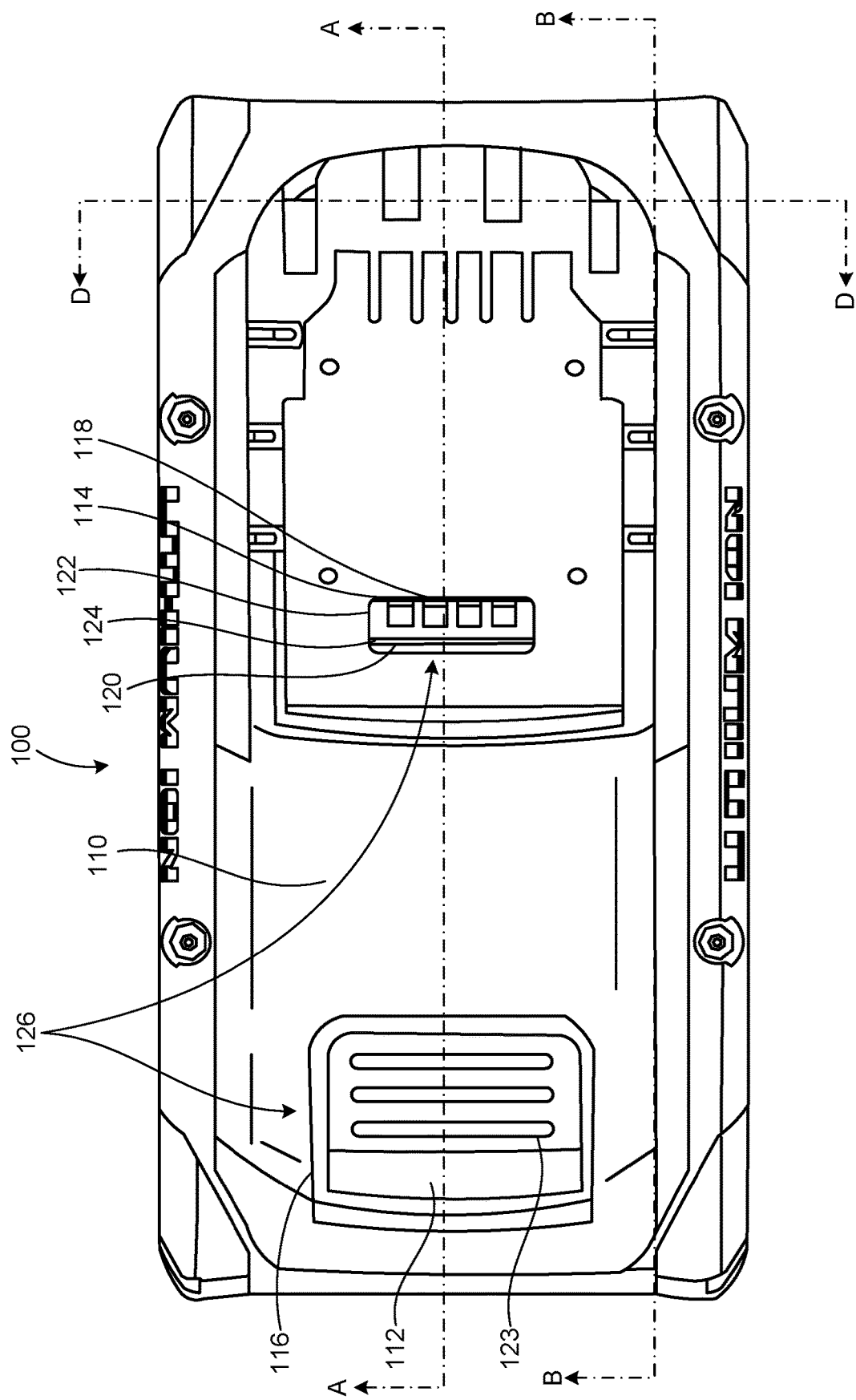
FIG. 3 is a top view of the battery pack of FIG. 1.

FIG. 1 illustrates a perspective view of an example embodiment of a battery pack 100. Referring also to FIG. 2 and FIG. 3, FIG. 2 illustrates a side view of the battery pack 100 and FIG. 3 illustrates a top view of the battery pack 100. The battery pack 100 includes a housing 110 that encloses one or more battery cells to provide power to a piece of equipment such as, for example, a power tool, a lawn and garden tool, a radio, and other different types of equipment, when the battery pack 100 is attached to the piece of equipment. The battery pack 100 is a rechargeable battery pack meaning that the battery cells housed within the battery pack 100 may be discharged by using the battery pack 100 to power the piece of equipment and the battery cells within the battery pack 100 may be recharged by connecting the battery pack 100 to a recharging station, such as a battery pack charger.

The housing 110 includes a top portion 113, a first side portion 115 connected to the top portion 113, a second side portion 117 connected to the top portion 113 and opposite the first side portion 115, and a bottom portion 119 connected to both the first side portion 115 and the second side portion 117 and opposite the top portion 113. In some implementations, the housing 110 and its portions 113, 115, 117, and 119, define a cavity to hold a set of battery cells (not shown). A cell holder (not shown) may be within the cavity defined by the housing 110 and its portions 113, 115, 117, and 119, to hold the set of battery cells. Alternatively, the portions 113, 115, 117, and/or 119 may be the cell holder.

The battery pack 100 is a removable battery pack meaning that the battery pack 100 both engages/mates/couples with and attaches to the equipment and disengages/unmates/decouples and detaches from the equipment. The battery pack 100 slidably engages with and couples to the piece of equipment and locks into place with the piece of equipment. The battery pack 100 also decouples and slidably disengages from the piece of equipment. The battery pack 100 includes a latch assembly mechanism 126 to assist the battery pack 100 engage/mate/couple with and disengage/unmate/decouple from the piece of equipment. The latch assembly mechanism 126 includes among other components, a user activation button 112 and an engaging portion (also referred to as a latch) 114, that are visible from the external view of the battery pack 100, as illustrated in FIGS. 1-3. A complete view of the latch assembly mechanism 126, including the other components not visible in the external views of the battery pack 100, are illustrated in internal views of the battery pack 100, including FIGS. 4-12.

The housing 110 includes an opening 116 for the user activation button 112 to be exposed to the exterior of the battery pack 100. The housing 110 includes an opening 118 for the engaging portion 114 to be exposed to the exterior of the battery pack 100. The user activation button 112 is a depressible button that may be depressed by a user using one of the user's fingers (e.g., thumb, index finger, etc.). When the user activation button 112 is not depressed the latch assembly mechanism 126 (and the battery pack 100) is in a default state (also referred to as an engaged or mated or coupled state or an unengaged or unmated or decoupled state). This may occur when the battery pack 100 is not engaged or coupled to a piece of equipment or when the battery pack 100 is fully engaged or coupled to a piece of equipment. When the user activation button 112 is depressed the latch assembly mechanism 126 (and the battery pack 100) is in an engaging state (also referred to as a mating or coupling state or a unmating or decoupling state). When depressed, the user activation button 112 controls the movement of the engaging portion 114. When the user activation button 112 is depressed, the user activation button 112 causes the engaging portion 114 to recede into the opening 118 of the housing 110. When the user activation button 112 is depressed, at least a portion of the user activation button 112 recedes into the opening 116 of the housing 110. Releasing the user activation button 112 causes the user activation button 112 to return to its normal (default), undepressed position and causes the engaging portion 114 to return to its normal position with the engaging portion 114 protruding through the opening 118 of the housing 110. The operation and movement of the user activation button 112 and the engaging portion 114 is illustrated in full detail in the internal views of the battery pack 100, including FIGS. 4-10.

In some implementations, the user activation button 112 may include one or more raised ribs 123, as illustrated in FIG. 3. The ribs 123 may provide a better surface for a user's finger to depress the user activation button 112 without slipping off of the user activation button 112 while depressing the user activation button 112. The ribs 123 provide a gripping surface to maintain contact between the user's finger and the user activation button 112 during operation of the user activation button 112.

The engaging portion 114 includes a flat side 120 and an angled side 122, as best illustrated in FIG. 2. The flat side 120 and the angled side 122 join at a line 124. At least a portion of the flat side 120 and at least a portion of the angled side 122 protrude through the opening 118 when the latch assembly mechanism 126 is in the default state. The latch assembly mechanism 126 is in a default/engaged/unengaged position with the user activation button 112 undepressed and the engaging portion 114 extending or protruding through the opening 118 of the housing 110. The latch assembly mechanism 126 is in an engaging/unengaging position with the user activation button 112 depressed and the engaging portion 114 at least partly recessed into the opening 118 of the housing 110. The flat side 120 and the angled side 122 form the engaging portion 114, which acts like a hook to engage a recessed area on the piece of equipment and assists to secure the battery pack 100 to the equipment.

In operation, the battery pack 100 slides onto the piece of equipment. The engaging portion 114 may recede into the opening 118 of the housing 110 as the battery pack 100 slides onto the piece of equipment to allow the battery pack 100 to fully slide onto the piece of equipment. When the battery pack 100 has fully slid onto (mated with/seated with/coupled to) the piece of equipment, the engaging portion 114 returns to its default state and fixes the battery pack 100 onto the piece of equipment. The battery pack 100 remains secured to the piece of equipment until the user activation button 112 is depressed to cause the engaging portion 114 to move and recede into the opening 118 of the housing 110, which enables the battery pack 100 to disengage/decouple/unmate from the piece of equipment.

Figure 4:
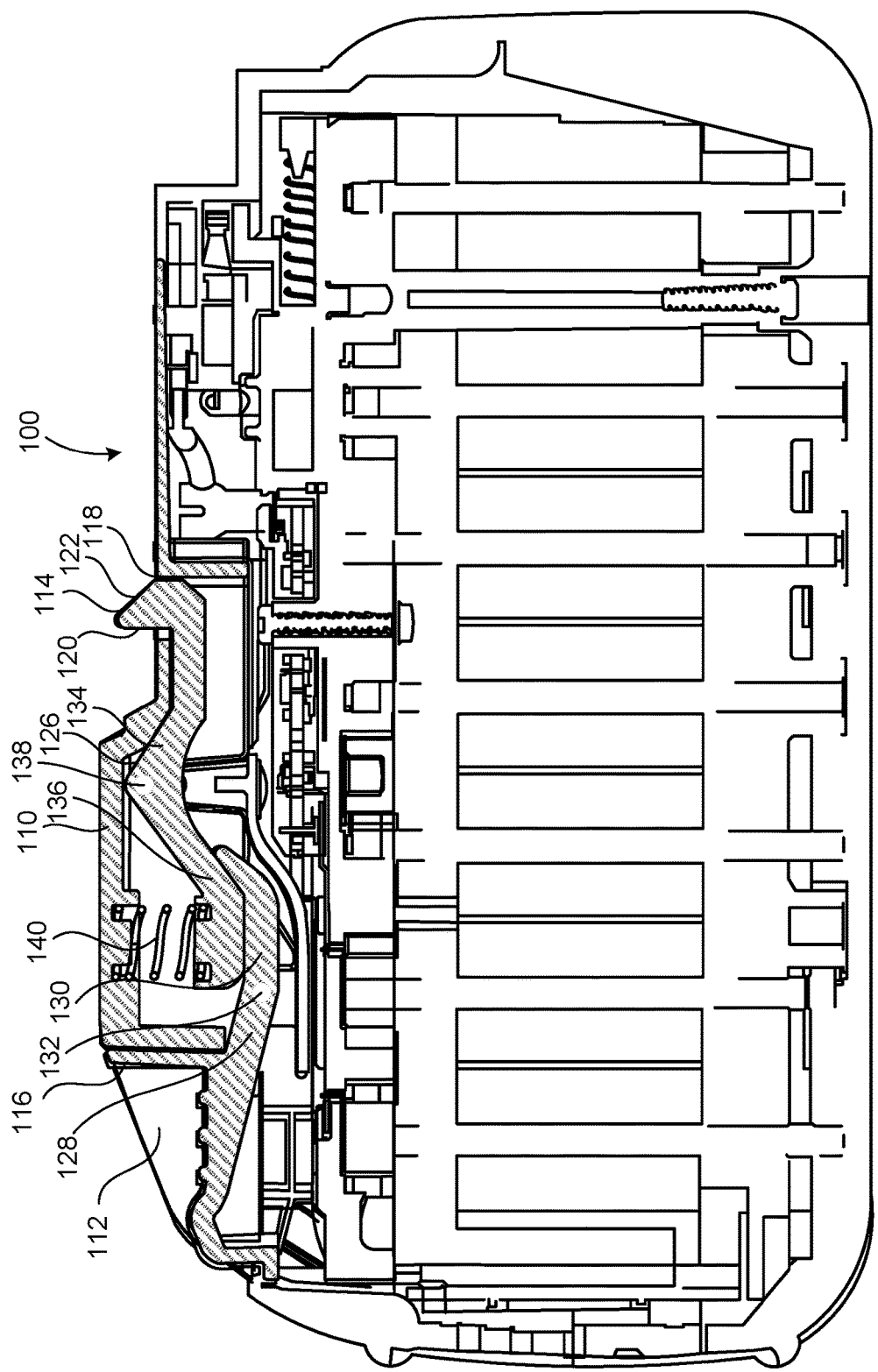
FIG. 4 is a cross-sectional view of the battery pack of FIG. 3 along section line A-A in a default/unmated/mated state.
Figure 5:
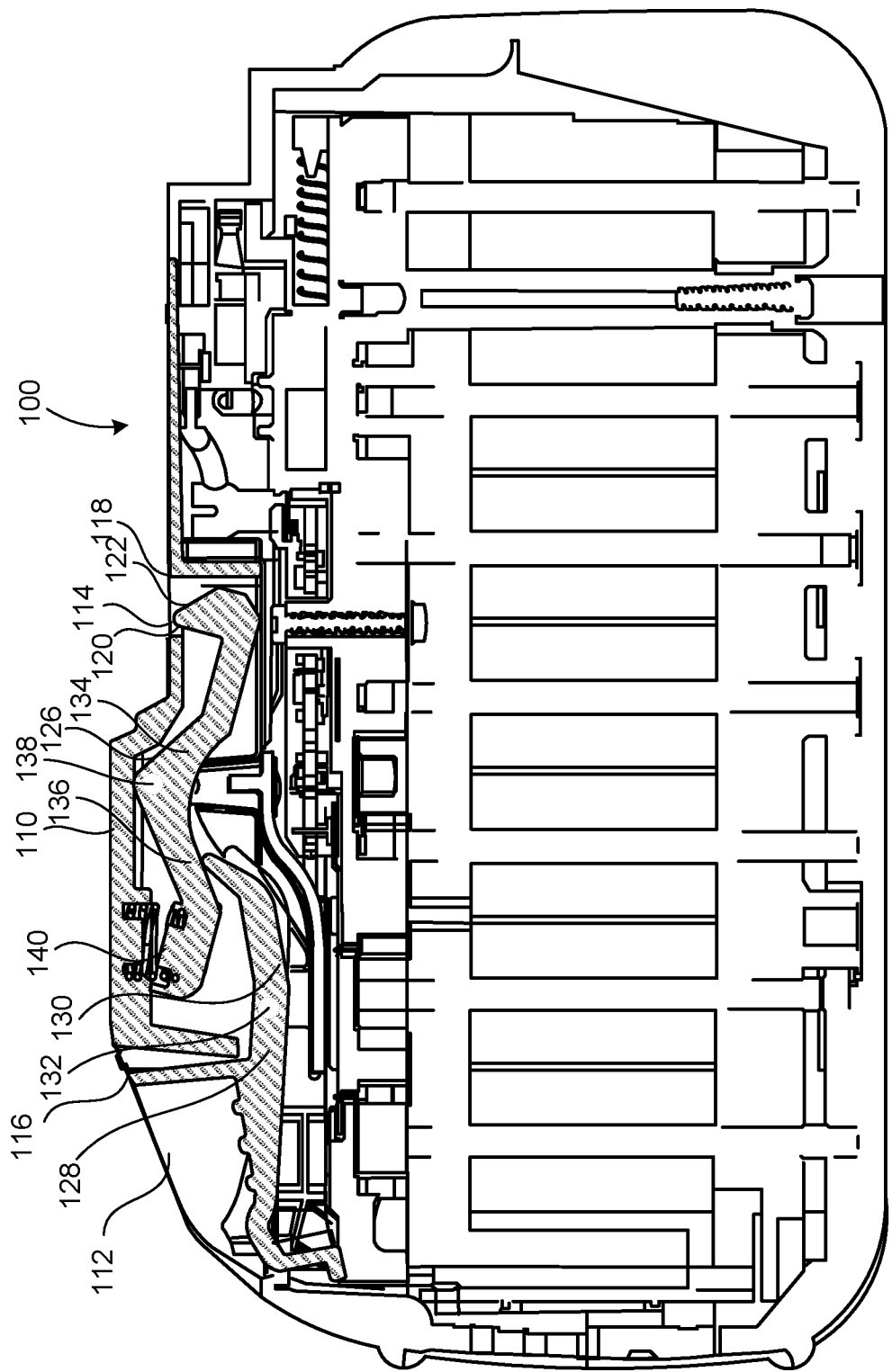
FIG. 5 is a cross-sectional view of the battery pack of FIG. 3 along section line A-A in an engaging/mating state.

FIG. 4 illustrates a cross-sectional view of the battery pack 100 in an engaged state with the equipment (not shown) taken along line A-A of FIG. 3. FIG. 4 provides an internal view of the battery pack 100 and the components of the latch assembly mechanism 126. FIG. 5 illustrates a cross-sectional view of the battery pack 100 in an engaging/mating state or a disengaging/unmating state taken along line A-A of FIG. 3. FIG. 5 provides an internal view of the battery pack 100 and the components of the latch assembly mechanism 126.

The latch assembly mechanism 126 includes the user activation button 112 and the engaging portion 114 that were illustrated in the external view of the battery pack 100 in FIGS. 1-3. In this embodiment of the latch assembly mechanism 126, the user activation button 112 and the engaging portion 114 are discrete components. Each part of the latch assembly mechanism rotates about two fixed pivots (pivot axis). The multi-part (e.g., two-part) latch assembly mechanism that rotates about two fixed pivots improves upon a single part latch that relies upon a translational motion of up and down using translational slots. The fixed pivots can be more tightly controlled compared to translational slots. For one reason, the amount of surface area involved in the rotational motion about the fixed pivots is smaller compared to the surface area involved in the translational motion within the translational slots. More specifically, the surface area involved in the rotational motion about the fixed pivots is the circumference of the pivot. In contrast, the surface area involved in the translational motion within the translational slots in the entire length of the slot, which is a larger surface area than the surface area of the circumference of the pivot. For another reason, the relative motion of the pivot is much less than the relative motion of the translational slot. These advantages provided by the fixed pivots enables the two-part latch assembly mechanism using the fixed slots to remain tight and stable, even over long distances, such as the increased distances in the longer, bigger battery packs.

Figure 6A:
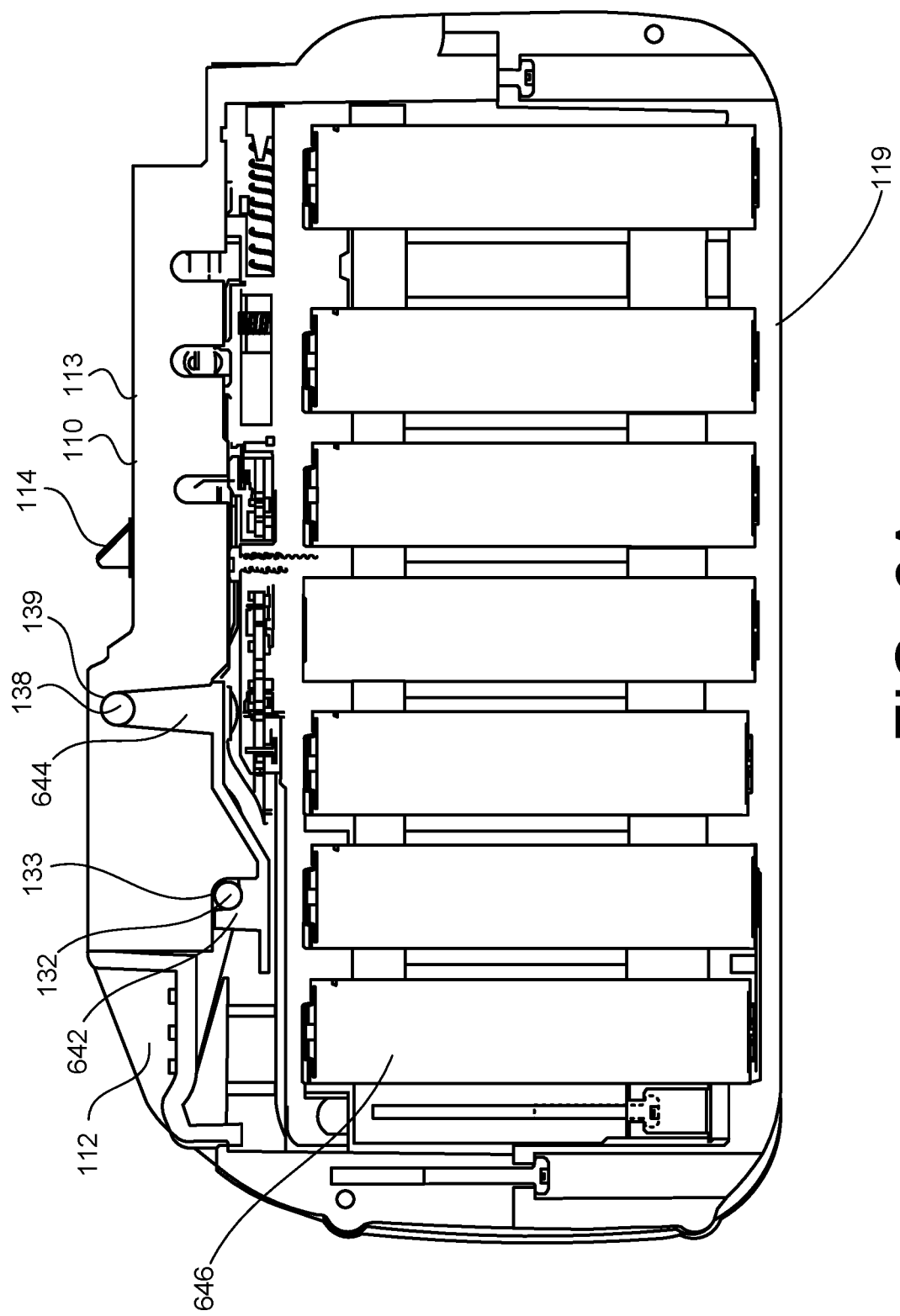
FIG. 6A is a cross-sectional view of the battery pack of FIG. 3 along section line B-B in an engaging/mating state illustrating a button pivot arm and a latch pivot arm.
Figure 6B:
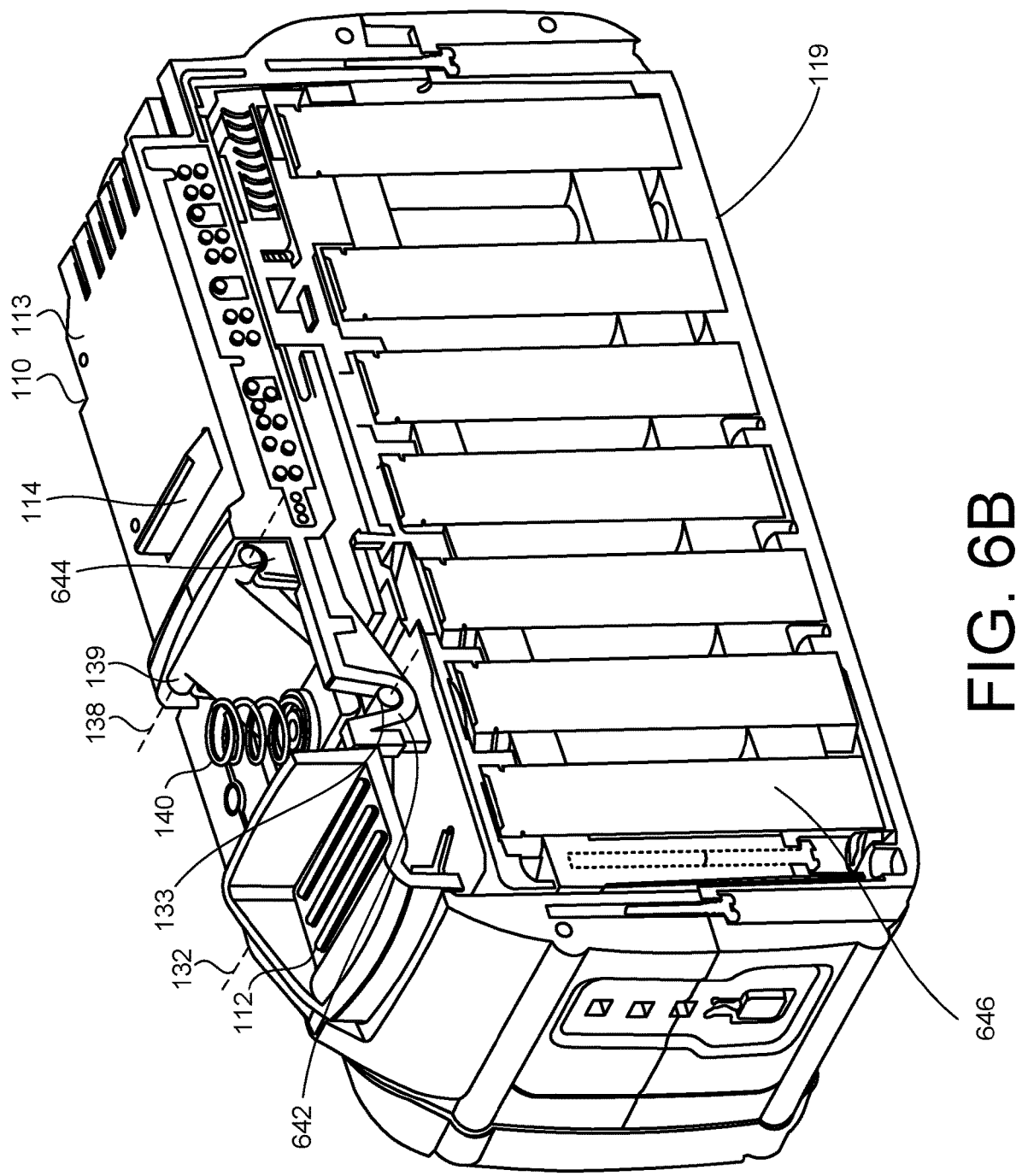
FIG. 6B is a perspective, cross-sectional view of the battery pack of FIG. 3 along section line B-B with a top part of the housing removed to show the latch assembly mechanism.

The first part of the latch assembly mechanism 126 includes the user activation button 112, a button extension 128, and a button extension arm 130. The button extension 128 includes the button extension arm 130. The button extension 128 and the button extension arm 130 are connected to the user activation button 112. In some implementations, the user activation button 112, the button extension 128, and the button extension arm 130 are all one integrated component. The button extension arm 130 includes a button pivot shoulder 133, as illustrated below in FIGS. 6B, 9, and 10. The button pivot shoulder 133 provides a point of rotation for the user activation button 112, the button extension 128 and the button extension arm 130. The button pivot shoulder 133 rests on a button pivot support illustrated in FIGS. 6A and 6B. The user activation button 112, the button extension 128, and the button extension arm 130 rotate about a button pivot axis 132. The button pivot axis 132 is best illustrated in FIGS. 6A and 6B.

The button extension 128 is connected to the user activation button 112 and extends from an internal side of the user activation button 112. The button extension 128 extends past the button pivot axis 132 and includes the button extension arm 130. In operation, when the user activation button 112 is depressed and released, the user activation button 112 and the button extension 128 rotate about the button pivot axis 132. Additional details related to the user activation button 112, the button extension 128, the button extension arm 130, and the button pivot axis 132 are illustrated in FIGS. 7-10, as described below.

Figure 9:
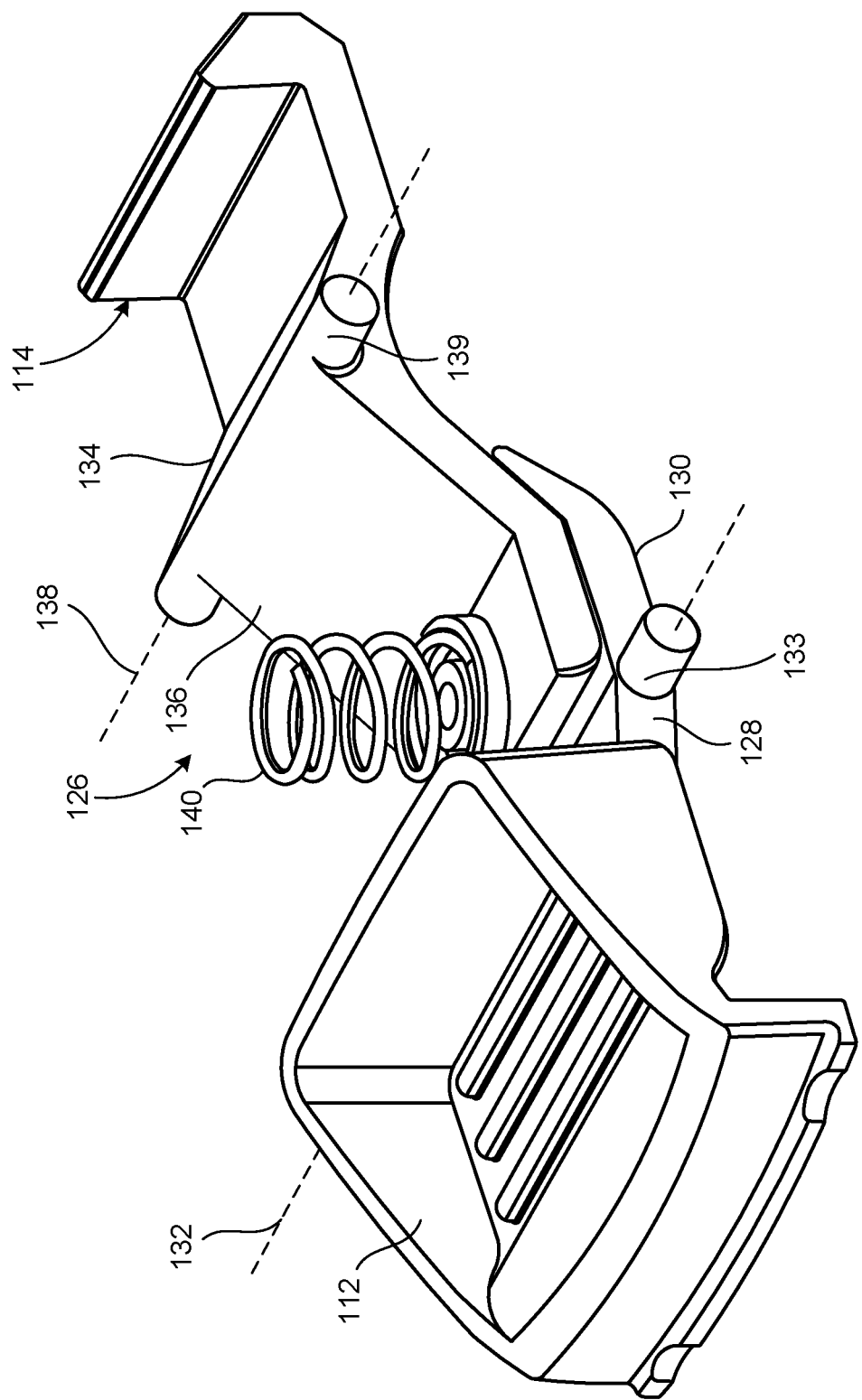
FIG. 9 is a perspective view of the latch assembly mechanism of FIG. 7.
Figure 10:
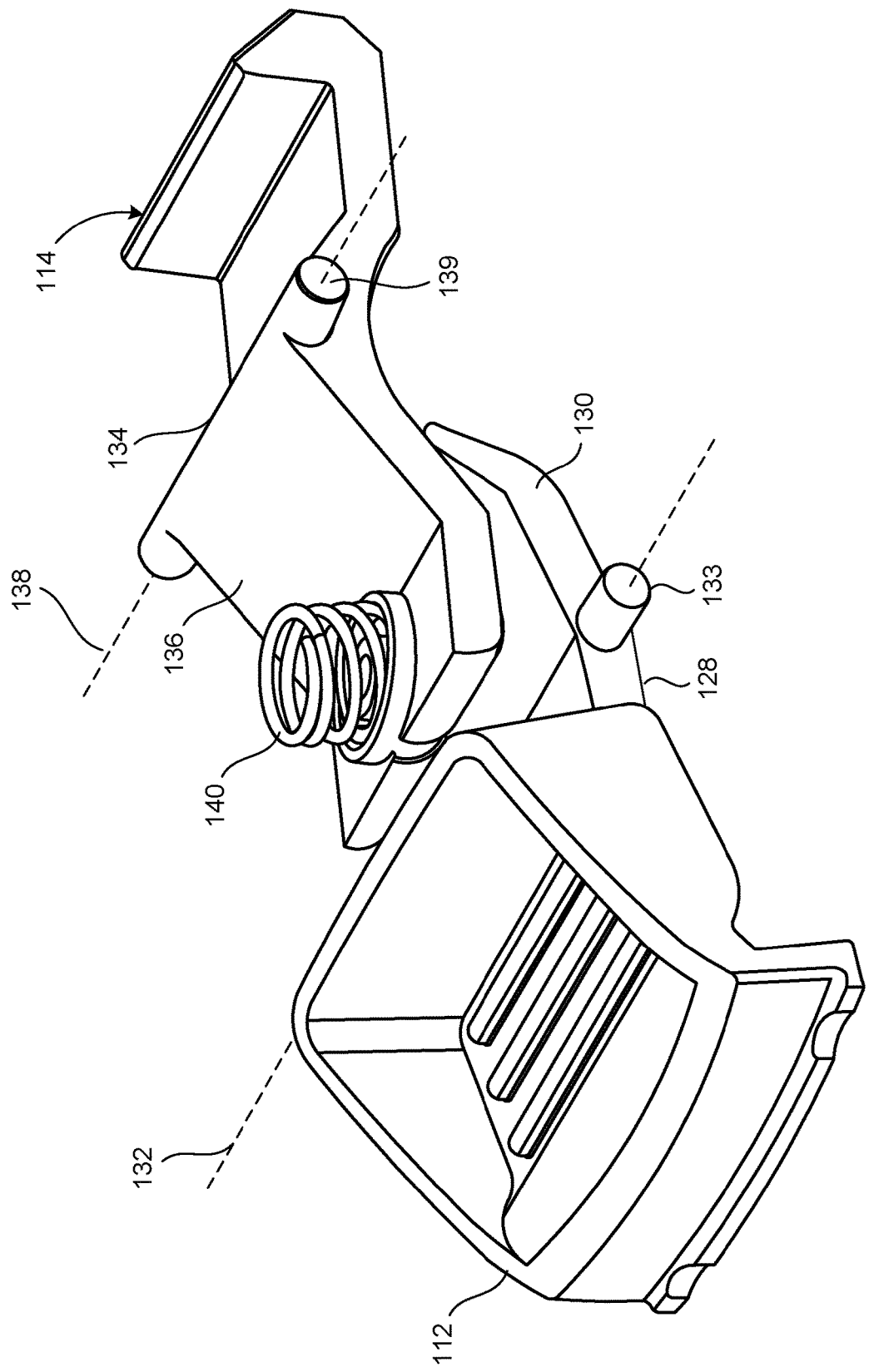
FIG. 10 is a perspective view of the latch assembly mechanism of FIG. 8.

The second part of the latch assembly mechanism 126 includes the engaging portion 114, a latch extension 134, and a latch extension arm 136. The latch extension 134 includes the latch extension arm 136. The latch extension 134 and the latch extension arm 136 are connected to the engaging portion 114. In some implementations, the engaging portion 114, the latch extension 134 and the latch extension arm 136 are single integrated component. The latch extension arm 136 includes a latch pivot shoulder 139, as illustrated in FIGS. 6B, 9 and 10. The latch pivot shoulder 139 provides a point of rotation for the engaging portion 114, the latch extension 134 and the latch extension arm 136. The latch pivot shoulder 139 rests on a latch pivot support 644, as illustrated in FIGS. 6A and 6B. The engaging portion 114, the latch extension 134, and the latch extension arm 136 rotate about a latch pivot axis 138. The latch pivot axis 138 is best illustrated in FIGS. 6A and 6B.

Figure 7:
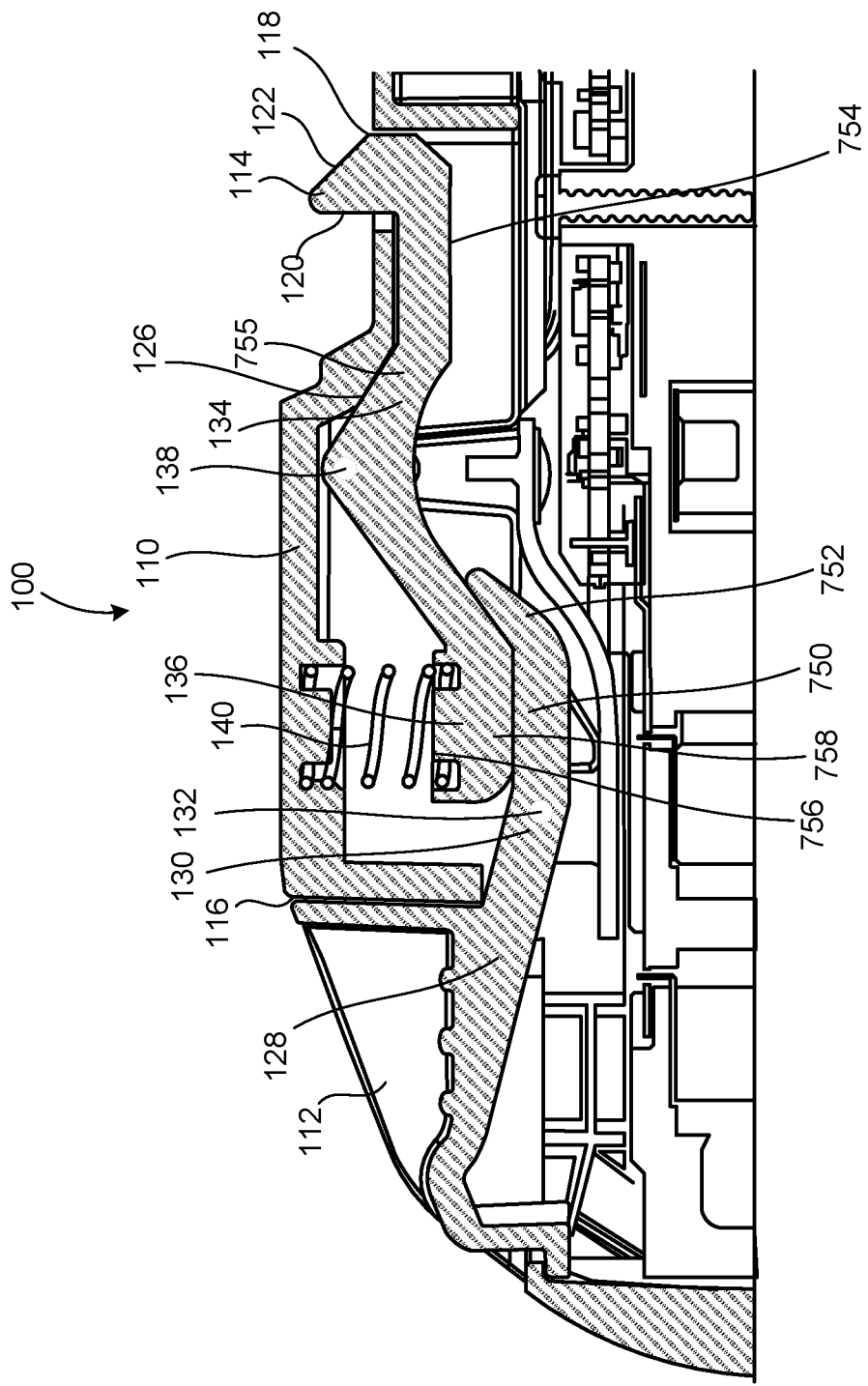
FIG. 7 is a detailed view of the latch assembly mechanism of FIG. 4.
Figure 8:
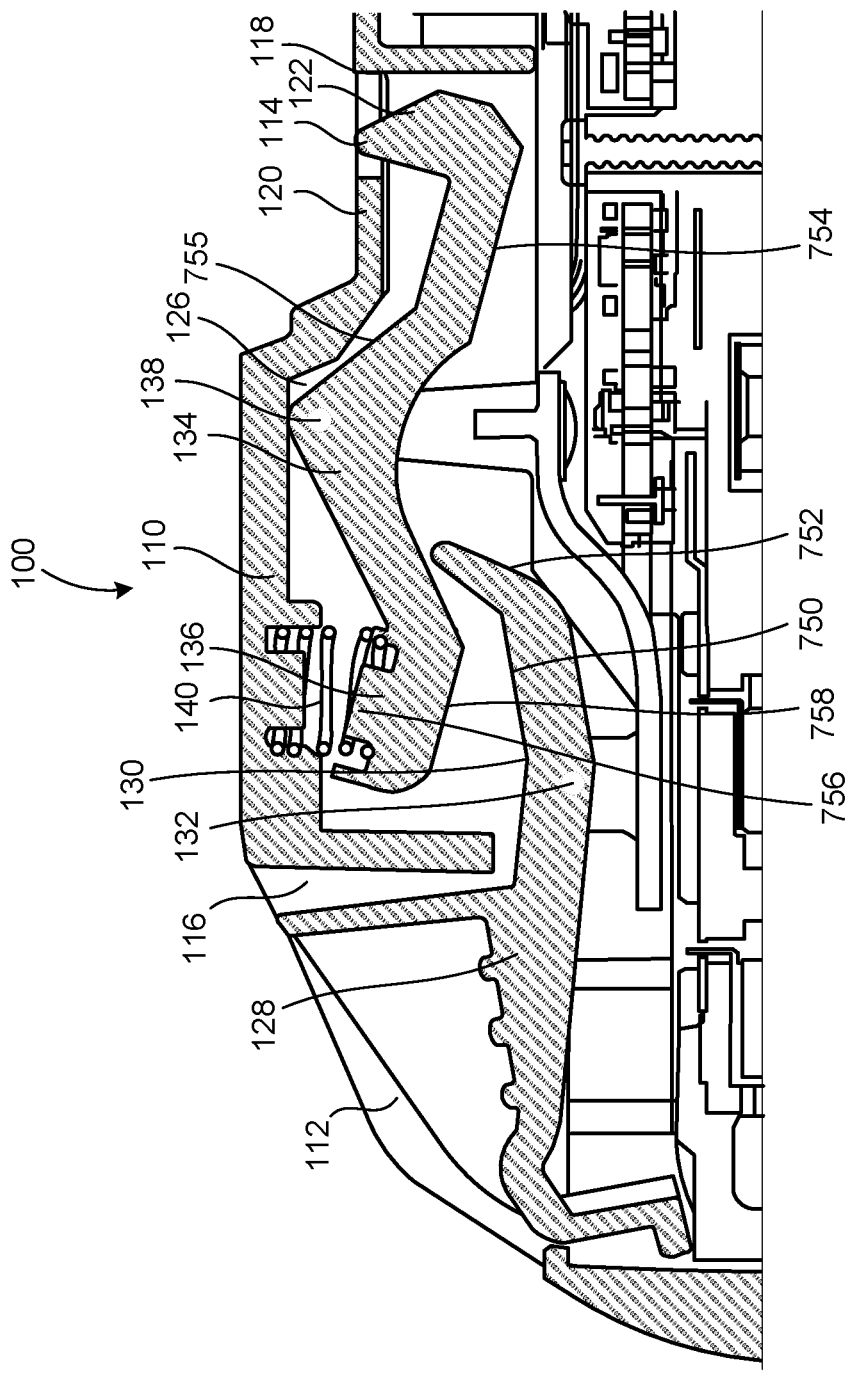
FIG. 8 is a detailed view of the latch assembly mechanism of FIG. 4.

The latch extension 134 is connected to the engaging portion 114 and extends from an internal side of the engaging portion 114. The latch extension 134 extends past the latch pivot axis 138 and includes the latch extension arm 136. In operation, the engaging portion 114 and the latch extension 134 rotate about the latch pivot axis 138. Additional details related to the engaging portion 114, the latch extension 134, the latch extension arm 136, and the latch pivot axis 138 are illustrated in FIGS. 7-9, as described below.

As illustrated in FIGS. 4 and 5, the button extension arm 130 engages and interfaces with the latch extension arm 136. The button extension arm 130 is disposed between the latch extension arm 136 and a battery cell holder. The latch extension arm 136 engages and interfaces with the button extension arm 130. The latch extension arm 136 is disposed between the button extension arm 130 and the upper housing portion of the battery housing.

In some implementations, the battery pack 100 includes a spring 140. The spring 140 is internal to the battery pack 100. The spring 140 acts to keep the latch assembly mechanism 126 in the default state with the user activation button 112 in an undepressed position and the engaging portion 114 protruding through the opening 118 in the housing 110 when a user is not pressing on the user activation button 112. The spring 140 also acts to return the latch assembly mechanism 126 to the default state after a user releases the user activation button 112.

In some implementations, the spring 140 is disposed on the latch extension arm 136. The spring 140 is disposed between the latch extension arm 136 and an interior side of the top portion of the housing 110. The spring 140 provides a force acting on both the latch extension arm 136, which is in direct contact with the spring 140, and the button extension arm 130, which is in direct contact with the latch extension arm 136. A user able to depress the user activation button 112 to overcome the force of the spring 140, by depressing the user activation button 112.

When the user activation button 112 is not depressed, as illustrated in FIG. 4, the user activation button 112 is forced in a clockwise direction (from the orientation of FIG. 4) about the button pivot axis 132 by the force of the spring 140. The button extension 128 and the button extension arm 130 are also forced in a clockwise direction about the button pivot axis 132 by the force of the spring 140. The engaging portion 114 is forced in a counter clockwise direction (from the orientation of FIG. 4) about the latch pivot axis 138 by the force of the spring 140. The latch extension 134 and the latch extension arm 136 are also forced in a counter clockwise direction about the latch pivot axis 138 by the force of the spring 140. The engaging portion 114 is forced to extend through the opening 118 in the housing 110.

When the user activation button 112 is depressed to overcome the force of the spring 140, as illustrated in FIG. 5, the user activation button 112 is forced in a counter clockwise direction (from the orientation of FIG. 5) about the button pivot axis 132. As a result, the button extension 128 and the button extension arm 130 are forced in a counter clockwise direction about the button pivot axis 132. The button extension arm 130 being engaged with the latch extension arm 136 forces the latch extension arm 136, the latch extension 134 and the engaging portion 114 in a clockwise direction about the latch pivot axis 138, overcoming the force of the spring 140. As a result, the engaging portion 114 is drawn inside through the opening 118 of the housing 110. When the user activation button 112 is released, the latch assembly mechanism 126 returns to the default state, as illustrated in FIG. 4.

FIG. 6A illustrates a cross-sectional view of the battery pack 100 in the default state taken along line B-B of FIG. 3. FIG. 6B is a perspective, cross-sectional view of the battery pack 100 of FIG. 3 along section line B-B with a top part of the housing removed to show the latch assembly mechanism.

FIGS. 6A and 6B illustrate a button pivot shoulder (also referred to as an arm) 133 and a latch pivot shoulder (also referred to as an arm) 139. The button pivot shoulder 133 is supported by a button pivot support 642 and the latch pivot shoulder 139 is supported by a latch pivot support 644. The button pivot support 642 and the latch pivot support 644 are permanent, fixed structures on which the button pivot shoulder 133 and the latch pivot shoulder 139 rest, respectively.

In some implementations, the button pivot shoulder 133 provides a rounded circumference as a point of rotation for the user activation button 112 and the button extension 128. In some implementations, the latch pivot shoulder 139 provides a rounded circumference as a point of rotation for the engaging portion 114 and the latch extension 134.

With FIGS. 6A and 6B illustrating the first side portion 115 removed, a cell holder 646 is illustrated. As mentioned above, the cell holder 646 holds a set of battery cells within the housing 110. The cell holder 646 is within the housing 110 and the portions of the housing 113, 115, 117, and 119.

FIG. 7 illustrates an enlarged, cross-sectional view of the battery pack 100 of FIG. 4 in the default/unmated/mated state, including a detailed view of the latch assembly mechanism 126. FIG. 8 illustrates an enlarged, cross-sectional view of the battery pack 100 of FIG. 4 in a unmating/mating state, including a detailed view of the latch assembly mechanism 126. FIG. 9 is a perspective view of the latch assembly mechanism of FIG. 7. FIG. 10 is a perspective view of the latch assembly mechanism of FIG. 8.

As illustrated in FIGS. 7-10, the latch assembly mechanism 126 is a multi-part (e.g., two-part) latch, where the first part includes the user activation button 112 and the button extension 128 and the second part includes the engaging portion 114 and the latch extension 134. The button extension 128 includes the button extension arm 130 and the latch extension 134 includes the latch extension arm 136. The latch assembly mechanism includes two pivot axes: the button pivot axis 132 and the latch pivot axis 138. The user activation button 112 and the button extension 128 pivot about the button pivot axis 132 and the engaging portion 114 and the latch extension 134 pivot about the latch pivot axis 138.

As illustrated in the enlarged views of FIGS. 7 and 8, the button extension 128 is angled from the user activation button 112 towards the button extension arm 130. The button extension arm 130 includes a flat surface 750 and an angled portion 752. The flat surface 750 provides an interface area for the button extension arm 130 to interface with the latch extension arm 136. The angled portion 752 provides a structure and interface to raise the latch extension 134 and the latch extension arm 136 off of the flat surface 750 and cause the latch extension 134 and the engaging portion 114 to rotate about the latch pivot axis 138.

As discussed above, the engaging portion 114 includes a flat side 120 and an angled side 122. The latch extension 134 includes a flat portion 754 and an angled portion 755 that angles away from the flat portion 754 towards the latch pivot axis 138 and then angles from the latch pivot axis 138 towards the latch extension arm 136. The latch extension arm 136 includes a top flat surface 756 and a bottom flat surface 758. The top flat surface 756 provides an interface area for the spring 140 and the bottom flat surface 758 provides an interface to the flat surface 750 of the button extension arm 130.

When the user activation button 112 is not depressed, as illustrated in FIG. 7, the user activation button 112 is forced in a clockwise direction (from the orientation of FIG. 7) about the button pivot axis 132 by the force of the spring 140. The spring 140 is in an expanded state and exerts a force on the top flat surface 756 of the latch extension arm 136. In turn, the bottom flat surface 758 of the latch extension arm 136 exerts a force on the flat surface 750 of the button extension arm 130. Thus, the button extension 128 and the button extension arm 130 are also forced in a clockwise direction about the button pivot axis 132 by the force of the spring 140. The engaging portion 114 is forced in a counter clockwise direction (from the orientation of FIG. 7) about the latch pivot axis 138 by the force of the spring 140. The latch extension 134 and the latch extension arm 136 are also forced in a counter clockwise direction about the latch pivot axis 138 by the force of the spring 140. The engaging portion 114 is forced to extend through the opening 118 in the housing 110.

When the user activation button 112 is depressed to overcome the force of the spring 140, as illustrated in FIG. 8, the user activation button 112 is forced in a counter clockwise direction (from the orientation of FIG. 8) about the button pivot axis 132. As a result, the button extension 128 and the button extension arm 130 are forced in a counter clockwise direction about the button pivot axis 132. The button extension arm 130 engages the latch extension arm 136 and forces the latch extension arm 136, the latch extension 134 and the engaging portion 114 in a clockwise direction about the latch pivot axis 138, overcoming the force of the spring 140. More specifically, the flat surface 750 and the angled portion 752 of the button extension arm 130 rotate about the button pivot axis 132 to lift the bottom flat surface 758 of the latch extension arm 136, causing the latch extension 134 and the engaging portion 114 to rotate about the latch pivot axis 138. As a result, the engaging portion 114 is drawn inside through the opening 118 of the housing 110. When the user activation button 112 is released, the latch assembly mechanism 126 returns to the engaged state, as illustrated in FIG. 7.

Figure 11:
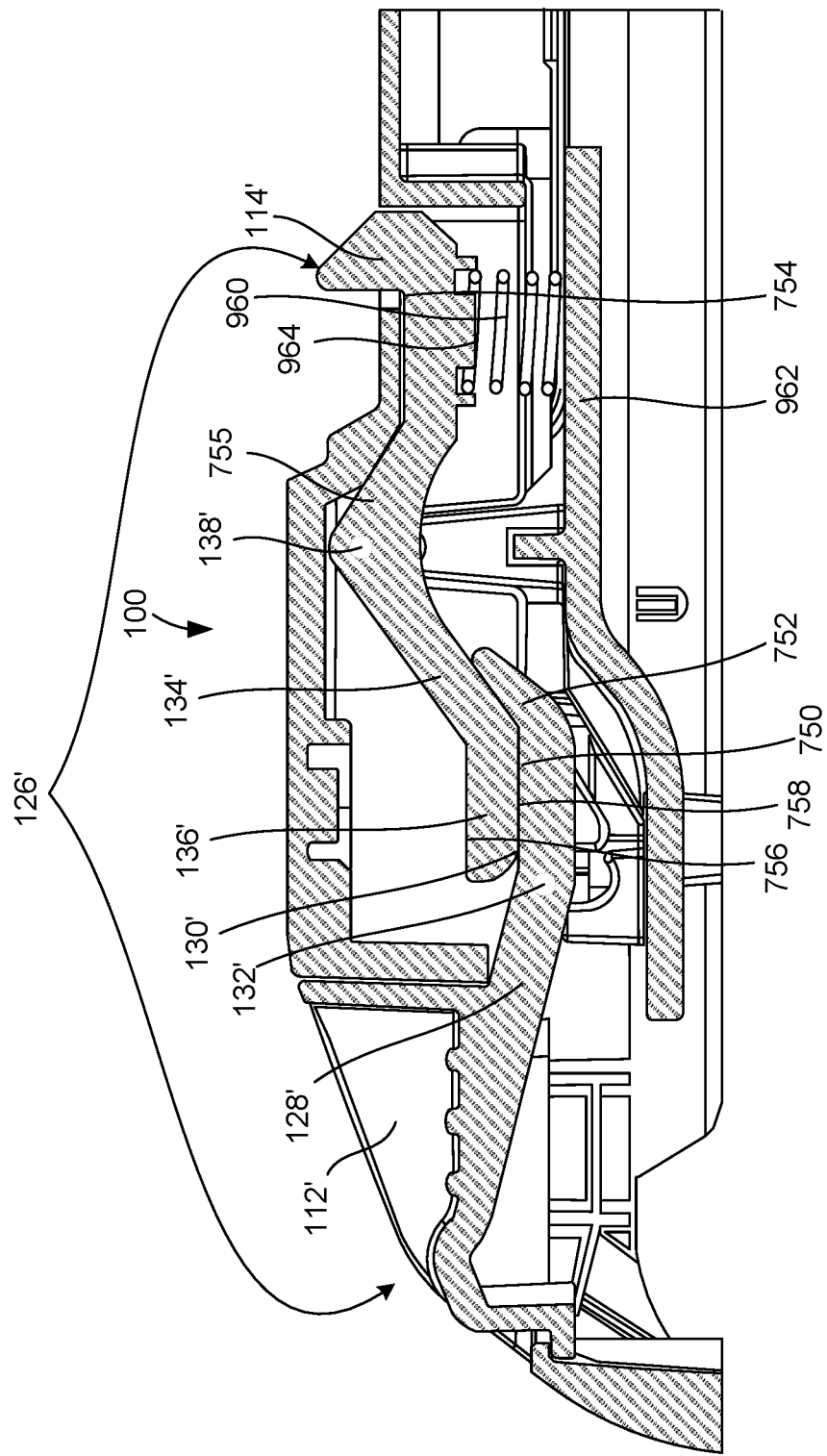
FIG. 11 is a detailed, cross-sectional view of the battery pack of FIG. 3 along section line A-A illustrating an alternate, example embodiment of a latch assembly mechanism in a default/unmated/mated state.
Figure 12:
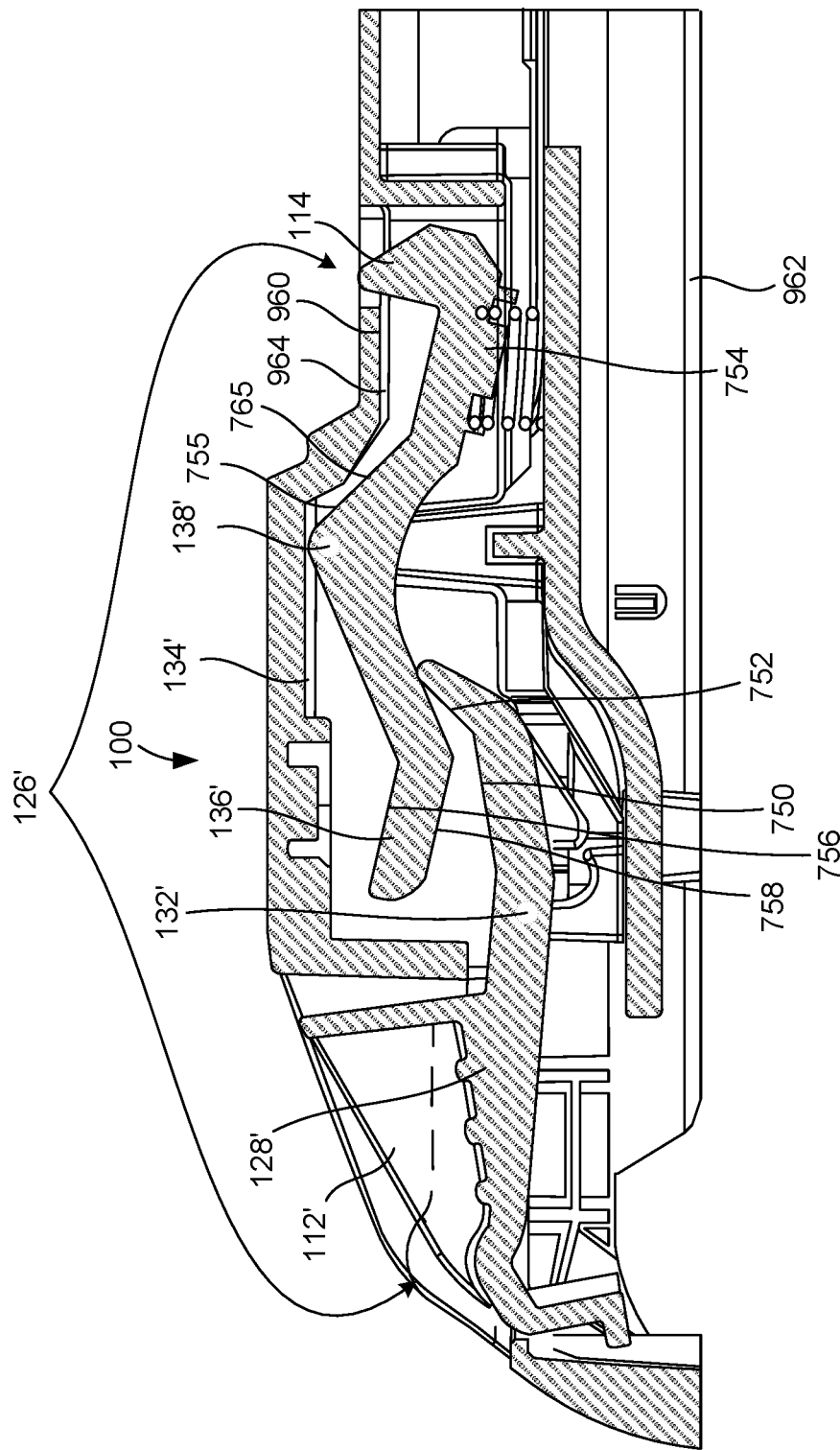
FIG. 12 is a detailed, cross-sectional view of the battery pack of FIG. 3 along section line A-A illustrating the alternate, example embodiment of the latch assembly mechanism in an engaging/unmating/mating state.

FIGS. 11 and 12 illustrate an enlarged, cross-sectional view of an alternate, example embodiment of a latch assembly mechanism 126' of the battery pack 100 of FIG. 3 taken along section line A-A. FIG. 11 illustrates the latch assembly mechanism 126' in a default/unmated/mated state and FIG. 12 illustrates the latch assembly mechanism 126' in an engaging/unmating/mating state. FIGS. 11 and 12 illustrate a spring 960 that is disposed on a spring support 962 and between a bottom surface 964 of the flat portion 754 of the latch extension 134' and a spring support 962. As illustrated in FIG. 11, the spring 960 exerts a force on the bottom surface 964 of the flat portion 754 of the latch extension 134' to force the engaging portion 114' through the opening 118 of the housing 110.

When the user activation button 112' is not depressed, as illustrated in FIG. 11, the user activation button 112' is forced in a clockwise direction (from the orientation of FIG. 11) about the button pivot axis 132' by the force of the spring 960. While the force of the spring 960 is not directly acting on the button extension 128' or the button extension arm 130', the force of the spring 960 is indirectly acting on the button extension 128' and the button extension arm 130' through the latch extension 134' and the latch extension arm 136'. More specifically, the spring 960 is in an expanded state and exerts a force on the bottom surface 964 of the flat portion 754 of the latch extension 134'. In turn, the bottom flat surface 758 of the latch extension arm 136' exerts a force on the flat surface 750 of the button extension arm 130'. Thus, the button extension 128' and the button extension arm 130' are also forced in a clockwise direction about the button pivot axis 132' by the force of the spring 960. The engaging portion 114' is forced in a counter clockwise direction (from the orientation of FIG. 11) about the latch pivot axis 138' by the force of the spring 960. The latch extension 134' and the latch extension arm 136' are also forced in a counter clockwise direction about the latch pivot axis 138' by the force of the spring 960. The engaging portion 114' is forced to extend through the opening 118 in the housing 110.

When the user activation button 112' is depressed to overcome the force of the spring 960, as illustrated in FIG. 12, the user activation button 112' is forced in a counter clockwise direction (from the orientation of FIG. 12) about the button pivot axis 132'. As a result, the button extension 128' and the button extension arm 130' are forced in a counter clockwise direction about the button pivot axis 132'. The button extension arm 130' engages the latch extension arm 136' and forces the latch extension arm 136', the latch extension 134' and the engaging portion 114' in a clockwise direction about the latch pivot axis 138', overcoming the force of the spring 960. More specifically, the flat surface 750 and the angled portion 752 of the button extension arm 130' rotate about the button pivot axis 132' to lift the bottom flat surface 758 of the latch extension arm 136', causing the latch extension 134' and the engaging portion 114' to rotate about the latch pivot axis 138'. The bottom surface 964 of the flat portion 754 of the latch extension 134' compresses the spring 960 against the spring support 962. As a result, the engaging portion 114' is drawn inside through the opening 118 of the housing 110. When the user activation button 112' is released, the latch assembly mechanism 126' returns to the default state, as illustrated in FIG. 11.

Figure 13:
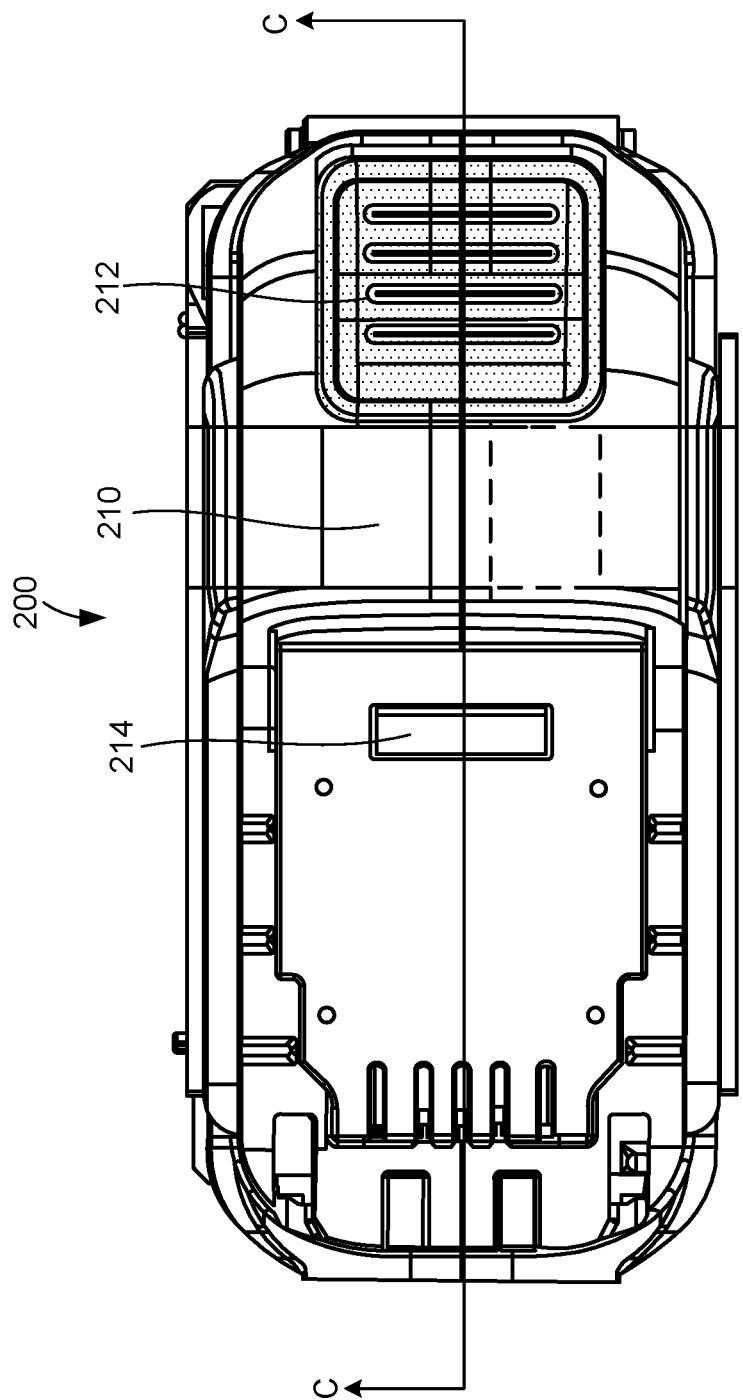
FIG. 13 is a top view of an example of a battery pack.

FIG. 13 is a top view of a battery pack 200. The battery pack 200 is similar to the battery pack 100 of FIGS. 1-12 but having a different latch implementation where the fixed pivot lines are in a different location within the battery pack 200 when compared to the fixed pivot lines within the battery pack 100. Similar to the battery pack 100 of FIGS. 1-12, the battery pack 200 of FIG. 11 includes a housing 210, a user activation button 212 and an engaging portion 214. The user activation button 212 and the engaging portion 214 function in the same or a similar manner to the user activation button 112 and the engaging portion 114 of FIGS. 1-12.

Figure 14:
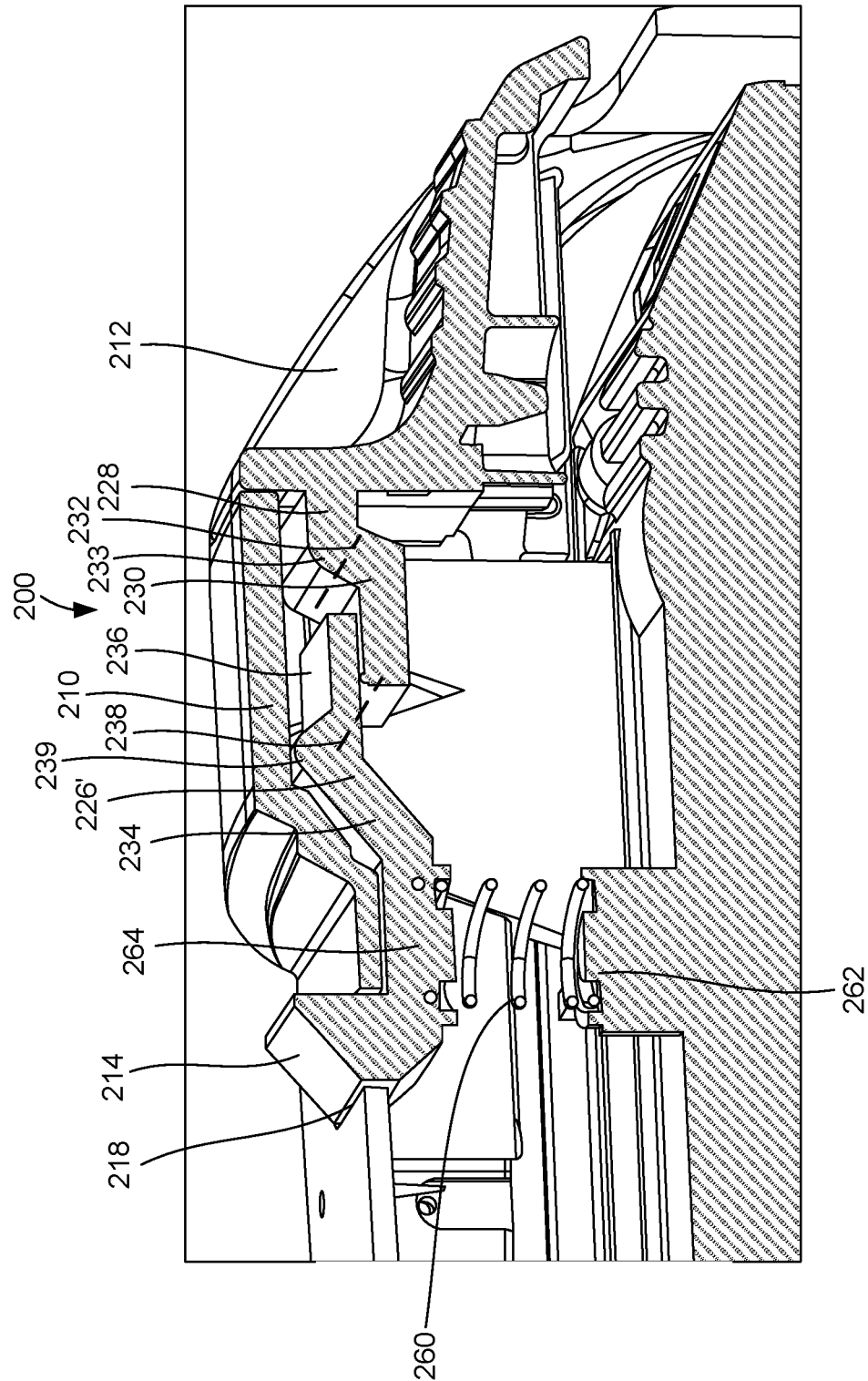
FIG. 14 is a detailed, cross-sectional view of the battery pack of FIG. 13 along cross-section line C-C illustrating another alternate, example embodiment of a latch assembly mechanism in a default/unmated/mated state.
Figure 15:
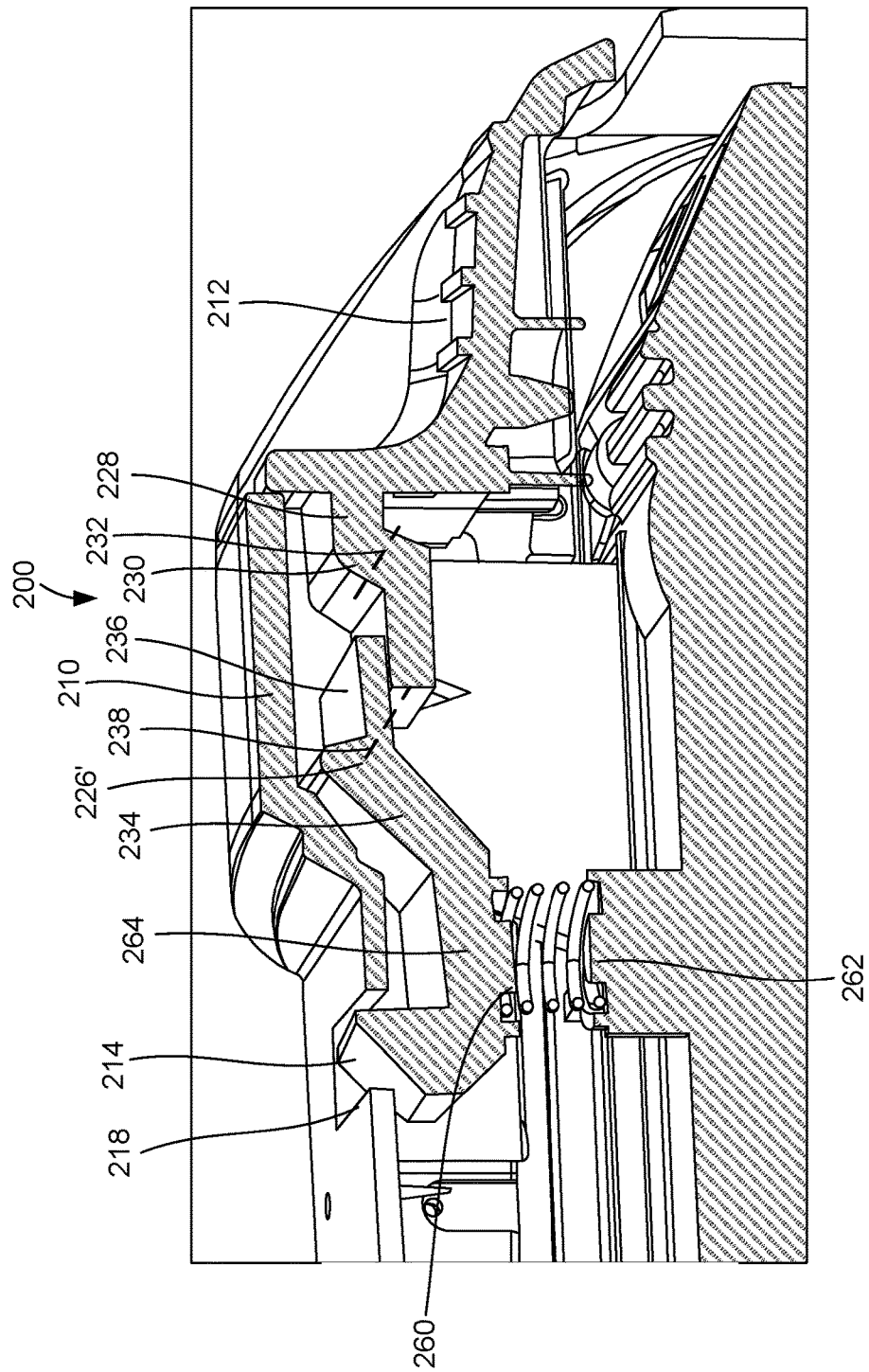
FIG. 15 is a detailed, cross-sectional view of the battery pack of FIG. 13 along cross-section line C-C illustrating the second alternate, example embodiment of the latch assembly mechanism in an engaging/unmating/mating state.

FIGS. 14 and 15 illustrate an enlarged, cross-sectional view of another alternate, example embodiment of a latch assembly mechanism 226 of the battery pack 200 taken along the line C-C of FIG. 13. FIG. 14 illustrates the latch assembly mechanism 226 in a default/unmated/mated state (also referred to as an unengaged/engaged state or an uncoupled/coupled stated) and FIG. 15 illustrates the latch assembly mechanism 226 in an engaging/disengaging state (also referred to as an uncoupling/coupling state). The latch assembly mechanism 226 is a two-part latch. The first part of the latch assembly mechanism 226 includes the user activation button 212 and the button extension 228, where the button extension 228 includes a button extension arm 230. The second part of the latch assembly mechanism 226 include the engaging portion 214 and the latch extension 234, where the latch extension 234 includes a latch extension arm 236. The button extension arm 230 provides a surface to interface with the latch extension arm 236. The latch extension arm 236 provides a surface to interface with the button extension arm 230. In this implementation, the latch extension arm 236 is disposed on the button extension arm 230.

The user activation button 212 and the button extension 228 rotate about a button pivot axis 232. The engaging portion 214 and the latch extension 234 rotate about a latch pivot axis 238. In this implementation, the button pivot axis 232 and the latch pivot axis 238 are in a same plane within the battery pack 200. The user activation button 212 and the engaging portion 214 are secured to at least one side of the housing 210 by a button pivot shoulder 233 and a latch pivot shoulder 239. The button pivot axis 232 and the latch pivot axis 238 may extend from one side of the housing 210 to the other side of the housing 210. The battery pack 200 includes a spring 260 disposed on a spring support 262. The spring 260 is disposed between the spring support 262 and a bottom surface of the latch extension 234.

In operation, the force of the spring 260 against the latch extension 234 causes the engaging portion 214 and the latch extension 234, including the latch extension arm 236, to rotate in a clockwise direction (from the orientation of FIG. 14) about the latch pivot axis 238. The rotational force of the latch extension arm 236 acts directly on the button extension arm 230 causing the button extension arm 230, the button extension 228 and the user activation button 212 to rotate in a counter clockwise direction (from the orientation of FIG. 14) about the button pivot axis 232 to force the user activation button 212 in an undepressed state. The force of the spring 260 forces the engaging portion 214 through an opening 218 in the housing 210.

When the user activation button 212 is depressed, as illustrated in FIG. 15, then the user activation button 212 and the button extension 228 rotate in a clockwise direction (from the orientation of FIG. 13) about the button pivot axis 232. The depressing of the user activation button 212 also causes the button extension arm 230 to rotate and lift the latch extension arm 236. The latch extension arm 236, the latch extension 234 and the engaging portion 214 rotate counter clockwise (from the orientation of FIG. 15) about the latch pivot axis 238 and the engaging portion 214 recesses into the opening 218 of the housing 210 to disengage the battery pack 200 from a piece of equipment.

As discussed above, it is desirable for battery packs to be designed to both accommodate newer and larger battery cells and to remain compatible with existing equipment and tools. To achieve both of these desired features, the plastic housing of the battery pack may be thinned such that the interior of the housing can accommodate larger battery cells and the exterior of the housing remains compatible with existing equipment and tools. To reinforce and strengthen the housing and other components of the battery pack, one or more inserts may be used for structural support of the housing. The inserts provide impact strength and structural support to the housing and other battery pack components, as discussed in more detail below. The combination of the plastic housing with the inserts maintains the desired thickness of the housing such that the interior of the housing can accommodate larger battery cells and the exterior of the housing remains compatible with existing equipment and tools. With the inserts, the housing is reinforced and strengthened.

The inserts may be made of different types of material. In some implementations, the inserts are made of metal. In some implementations, the metal inserts are made of steel. In some implementations, the metal inserts may be made of other types of metals, including combinations of metal types, that provide structural support and strength alongside the plastic material of the housing. In some implementations, the inserts are made of carbon fiber or an alternative plastic resin or a high mechanical/high dielectric material. In some implementations, the inserts are made of other materials examples including aluminium or titanium. In some implementations, the inserts are made of other alloys. In some implementations, the inserts are increased plastic strength. In some implementations, the inserts are made of a metallic material.

FIGS. 16-23 illustrate example alternate embodiments of the battery pack 100 of FIG. 1 with components of the housing 110 including a top enclosure, a first side cover connected to the top enclosure, a second side cover connected to the top enclosure, the second side cover opposite the first side cover, and a bottom enclosure connected to the first side cover and the second side cover, the bottom enclosure opposite the top enclosure. It is understood that the components of the housing 110 may each be separate components or may be integrated components in some manner. For instance, in some implementations, the top enclosure, the first side cover, the second side cover, and the bottom enclosure may each be separate components. In some implementations, the first side cover and the second side cover may be part of either the top enclosure or the bottom enclosure.

FIG. 16A is a side view of an example alternate embodiment of the battery pack 100 of FIG. 1 illustrating a transparent view of a side cover 1602 of the battery pack 100. The transparent view of the side cover 1602 illustrates that the side cover 1602 includes one insert 1604. The insert 1604 is designated in the figure using cross-hatching. In some implementations, the side cover 1602 is made of plastic with the insert 1604 molded into the plastic at a particular location. In this example, the insert 1604 is located at one end of the battery pack 100. While this illustration shows just one side cover 1602, it is understood that the opposite side cover, which is not visible in this view, also includes an insert molded into the opposite side cover. In some implementations, the insert on the opposite side cover is on the same end of the battery pack 100 as the insert 1604. In some implementations, the insert on the opposite side cover is on the opposite end of the battery pack 100 as the insert 1604.

While the insert 1604 is illustrated at one end of the battery pack 100, it is understood that the insert may be located anywhere along the side cover 1602. For example, in some implementations, the insert 1604 may be offset a distance from the end of the battery pack 100. In some implementations, the insert 1604 may be located in the center of the side cover 1602.

FIG. 16B is a side view of another example alternate embodiment of the battery pack 100 of FIG. 1 illustrating a transparent view of a side cover 1622 of the battery pack 100. The transparent view of the side cover 1622 illustrates that the side cover 1622 includes one insert 1624 that wraps around an edge 1626 of the side cover 1622. In this example, the insert 1624 provides additional structural support for the battery pack 100. Additionally, the insert 1624 is molded into the plastic forming the screw bosses 1628 around the screw holes 1630. The insert 1624 is designated in the figure using cross-hatching.

In some implementations, the side cover 1622 is made of plastic with the insert 1624 molded into the plastic at a particular location. In this example, the insert 1624 is located at one end of the battery pack 100. While this illustration shows just one side cover 1622, it is understood that the opposite side cover, which is not visible in this view, also includes an insert molded into the opposite side cover. In some implementations, the insert on the opposite side cover is on the same end of the battery pack 100 as the insert 1624. In some implementations, the insert on the opposite side cover is on the opposite end of the battery pack 100 as the insert 1624. FIG. 16C is a perspective view of the side cover 1622 of the of the battery pack 100 of FIG. 16B.

FIG. 17A is a side view of another example alternate embodiment of the battery pack 100 of FIG. 1 illustrating a transparent view of a side cover 1702 of the battery pack 100. The transparent view of the side cover 1702 illustrates that the side cover 1702 includes two inserts 1704 and 1706. The inserts 1704 and 1706 are designated in the figure using cross-hatching. In some implementations, the side cover 1702 is made of plastic with the inserts 1704 and 1706 molded into the plastic at particular locations. In this example, the insert 1704 is located at one end of the battery pack 100 and the insert 1706 is located at the opposite end of the battery pack 100. While this illustration shows just one side cover 1702, it is understood that the opposite side cover, which is not visible in this view, also includes two inserts molded into the opposite side cover.

FIG. 17B is a side view of another example alternate embodiment of the battery pack of FIG. 1 illustrating a transparent view of a side cover 1722 of the battery pack 100. The transparent view of the side cover 1722 illustrates that the side cover 1722 includes an insert 1724 that wraps around an edge 1726 of the side cover 1722 and an insert 1734 that wraps around an edge 1736 of the side cover 1722. In this example, the inserts 1724 and 1734 provide additional structural support for the battery pack 100 by wrapping around the edges 1726 and 1736 of the side cover 1722. Additionally, the insert 1724 is molded into the plastic forming the screw bosses 1728 around the screw holes 1730. The insert 1734 is molded into the plastic forming the screw bosses 1738 around the screw holes 1740. The inserts 1724 and 1734 are designated in the figure using cross-hatching.

While this illustration shows just one side cover 1722, it is understood that the opposite side cover, which is not visible in this view, also includes two inserts molded into the opposite side cover. FIG. 17C is a perspective view of the side cover 1722 of the of the battery pack 100 of FIG. 17B. Furthermore, while two inserts are illustrated in FIGS. 17A-17C, it is understood that multiple inserts for "n" number of inserts may be molded into the side covers of the battery pack.

FIG. 18A is a side view of another example alternate embodiment of the battery pack 100 of FIG. 1 illustrating a transparent view of a side cover 1802 of the battery pack 100. The transparent view of the side cover 1802 illustrates that the side cover 1802 includes one insert 1804. The insert 1804 is designated in the figure using cross-hatching. In some implementations, the side cover 1802 is made of plastic with the insert 1804 molded into the plastic. In this example, the insert 1804 is molded into the side cover 1802 along the length of the side cover 1802. The insert 1804 provides protection and structural support at both ends of the side cover 1802 as well as in the center of the side cover 1802. While this illustration shows just one side cover 1802, it is understood that the opposite side cover, which is not visible in this view, also includes an insert molded into the opposite side cover.

FIG. 18B is a side view of another example alternate embodiment of the battery pack 100 of FIG. 1 illustrating a transparent view of a side cover 1822 of the battery pack 100. The transparent view of the side cover 1822 illustrates that the side cover 1822 includes one insert 1824 that wraps around the edges 1826 of the side cover 1822. In this example, the insert 1824 provides additional structural support for the battery pack 100. Additionally, the insert 1824 is molded into the plastic forming the screw bosses 1828 around the screw holes 1830. The insert 1824 is designated in the figure using cross-hatching.

While this illustration shows just one side cover 1822, it is understood that the opposite side cover, which is not visible in this view, also includes an insert molded into the opposite side cover. FIG. 18C is a perspective view of the side cover 1822 of the of the battery pack 100 of FIG. 18B.

Figure 19:
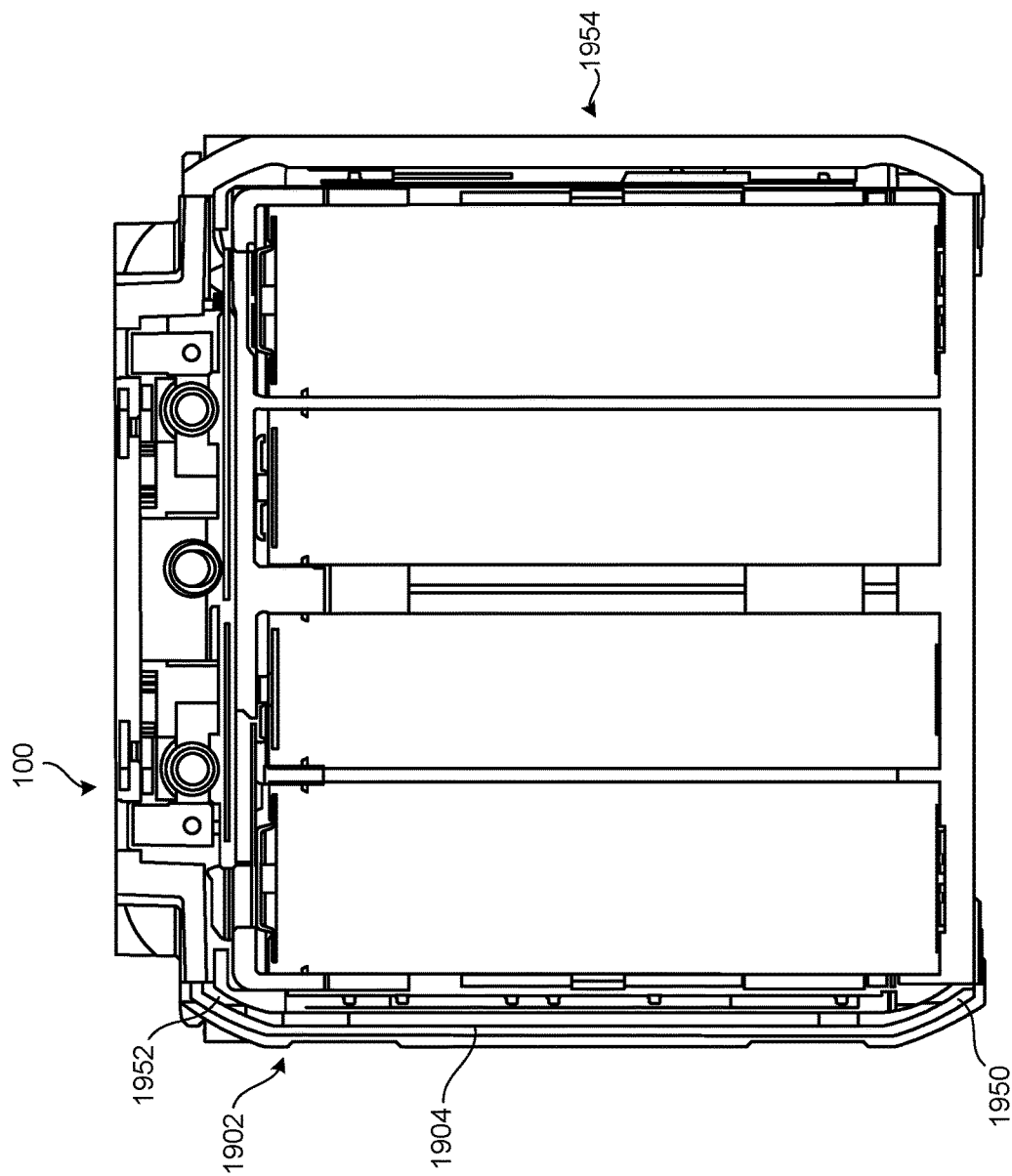
FIG. 19 is a cross-sectional view of the battery pack of FIG. 3 along a cross-section line D-D illustrating an insert in a side cover of the battery pack.

FIG. 19 is a cross-sectional view of the battery pack 100 of FIG. 3 along a cross-section line D-D illustrating an insert 1904 in a side cover 1902 of the battery pack 100. The cross-sectional view is illustrative of any of the embodiments described and illustrated in FIGS. 16A-16B, 17A-17B and 18A-18B. The insert 1904 covers the height of the side cover 1902 from the bottom 1950 of the side cover 1902 to the top 1952 of the side cover. While not illustrated in this view, it is understood that the opposite side cover 1954 also may include an insert molded into the plastic.

FIG. 20A is a side view of another example alternate embodiment of the battery pack 100 of FIG. 1 illustrating a transparent view of a side cover 2002 of the battery pack 100. The transparent view of the side cover 2002 illustrates that the side cover 2002 includes one insert 2004 having multiple holes 2060. The insert 2004 is designated in the figure using cross-hatching. In some implementations, the side cover 2002 is made of plastic with the insert 2004 molded into the plastic at a particular location. The holes 2060 assist during the injection molding process to enable the plastic to fill in around the insert 2004 through the holes 2060.

In this example, the insert 2004 is located at one end of the battery pack 100. While this illustration shows just one side cover 2002, it is understood that the opposite side cover, which is not visible in this view, also includes an insert having holes molded into the opposite side cover. In some implementations, the insert on the opposite side cover is on the same end of the battery pack 100 as the insert 2004. In some implementations, the insert on the opposite side cover is on the opposite end of the battery pack 100 as the insert 2004.

While the insert 2004 is illustrated at one end of the battery pack 100, it is understood that the insert may be located anywhere along the side cover 2002. For example, in some implementations, the insert 2004 may be offset a distance from the end of the battery pack 100. In some implementations, the insert 2004 may be located in the center of the side cover 2002.

FIG. 20B is a side view of another example alternate embodiment of the battery pack 100 of FIG. 1 illustrating a transparent view of a side cover 2022 of the battery pack 100. The transparent view of the side cover 2022 illustrates that the side cover 2022 includes one insert 2024 having holes 2070 that wraps around an edge 2026 of the side cover 2022. The holes 2070 assist in the molding process to allow the plastic to flow around the insert 2024 as the side cover 2022 is being formed. In this example, the insert 2024 provides additional structural support for the battery pack 100. Additionally, the insert 2024 is molded into the plastic forming the screw bosses 2028 around the screw holes 2030. The insert 2024 is designated in the figure using cross-hatching.

In some implementations, the side cover 2022 is made of plastic with the insert 2024 molded into the plastic at a particular location. In this example, the insert 2024 is located at one end of the battery pack 100. While this illustration shows just one side cover 2022, it is understood that the opposite side cover, which is not visible in this view, also includes an insert molded into the opposite side cover. In some implementations, the insert on the opposite side cover is on the same end of the battery pack 100 as the insert 2024. In some implementations, the insert on the opposite side cover is on the opposite end of the battery pack 100 as the insert 2024. FIG. 20C is a perspective view of the side cover 2022 of the of the battery pack 100 of FIG. 20B.

FIG. 21A is a side view of another example alternate embodiment of the battery pack 100 of FIG. 1 illustrating a transparent view of a side cover 2102 of the battery pack 100. The transparent view of the side cover 2102 illustrates that the side cover 2102 includes two inserts 2104 and 2106 having multiple holes 2160. The inserts 2104 and 2106 are designated in the figure using cross-hatching. In some implementations, the side cover 1702 is made of plastic with the inserts 2104 and 2106 molded into the plastic at particular locations. The holes 2160 assist during the injection molding process to enable the plastic to fill in around the insert 2104 and 2106 through the holes 2060.

In this example, the insert 2104 is located at one end of the battery pack 100 and the insert 2106 is located at the opposite end of the battery pack 100. While this illustration shows just one side cover 2102, it is understood that the opposite side cover, which is not visible in this view, also includes two inserts molded into the opposite side cover.

FIG. 21B is a side view of another example alternate embodiment of the battery pack of FIG. 1 illustrating a transparent view of a side cover 2122 of the battery pack 100. The transparent view of the side cover 2122 illustrates that the side cover 2122 includes an insert 2124 having holes 2170 that wraps around an edge 2126 of the side cover 2122 and an insert 2134 having holes 2170 that wraps around an edge 2136 of the side cover 2122. The holes 2170 assist in the molding process to allow the plastic to flow around the inserts 2124 and 2134 as the side cover 2122 is being formed. In this example, the inserts 2124 and 2134 provide additional structural support for the battery pack 100 by wrapping around the edges 2126 and 2136 of the side cover 2122. Additionally, the insert 2124 is molded into the plastic forming the screw bosses 2128 around the screw holes 2130. The insert 2134 is molded into the plastic forming the screw bosses 2138 around the screw holes 2140. The inserts 2124 and 2134 are designated in the figure using cross-hatching.

While this illustration shows just one side cover 2122, it is understood that the opposite side cover, which is not visible in this view, also includes two inserts molded into the opposite side cover. FIG. 21C is a perspective view of the side cover 2122 of the of the battery pack 100 of FIG. 21B. Furthermore, while two inserts are illustrated in FIGS. 21A-21C, it is understood that multiple inserts for "n" number of inserts may be molded into the side covers of the battery pack.

Figure 22A:
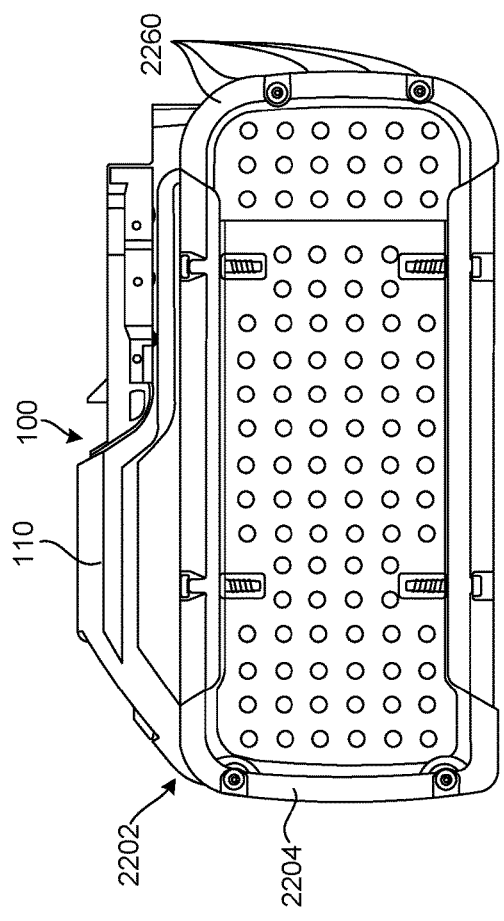
FIG. 22A is a side view of the battery pack of FIG. 1 illustrating a transparent view of an alternate example embodiment of a side cover of the battery pack with one insert having holes.

FIG. 22A is a side view of another example alternate embodiment of the battery pack 100 of FIG. 1 illustrating a transparent view of a side cover 2202 of the battery pack 100. The transparent view of the side cover 2202 illustrates that the side cover 2202 includes one insert 2204 having multiple holes 2260. The insert 2204 is designated in the figure using cross-hatching. In some implementations, the side cover 2202 is made of plastic with the insert 2204 molded into the plastic. The holes 2260 assist during the injection molding process to enable the plastic to fill in around the insert 2204 through the holes 2260.

In this example, the insert 2204 is molded into the side cover 2202 along the length of the side cover 2202. The insert 2204 provides protection and structural support at both ends of the side cover 2202 as well as in the center of the side cover 2202. While this illustration shows just one side cover 2202, it is understood that the opposite side cover, which is not visible in this view, also includes an insert having multiple holes molded into the opposite side cover.

Figure 22B:
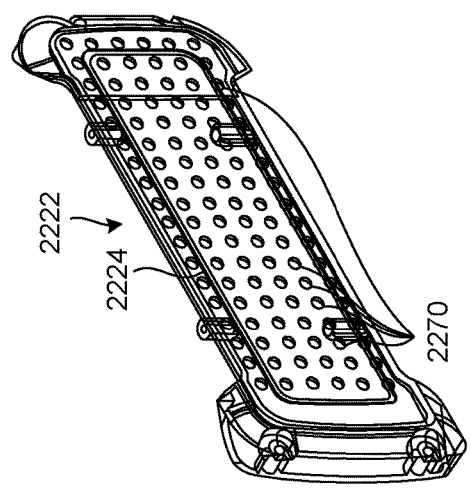
FIG. 22B is a side view of the battery pack of FIG. 1 illustrating a transparent view of an alternate example embodiment of a side cover of the battery pack with one insert having holes wrapping around an edge.

FIG. 22B is a side view of another example alternate embodiment of the battery pack 100 of FIG. 1 illustrating a transparent view of a side cover 2222 of the battery pack 100. The transparent view of the side cover 2222 illustrates that the side cover 2222 includes one insert 2224 having multiple holes 2270 that wraps around the edges 2226 of the side cover 2222. The holes 2270 assist in the molding process to allow the plastic to flow around the insert 2224 as the side cover 2222 is being formed. In this example, the insert 2224 provides additional structural support for the battery pack 100. Additionally, the insert 2224 is molded into the plastic forming the screw bosses 2228 around the screw holes 2230. The insert 2224 is designated in the figure using cross-hatching.

Figure 22C:
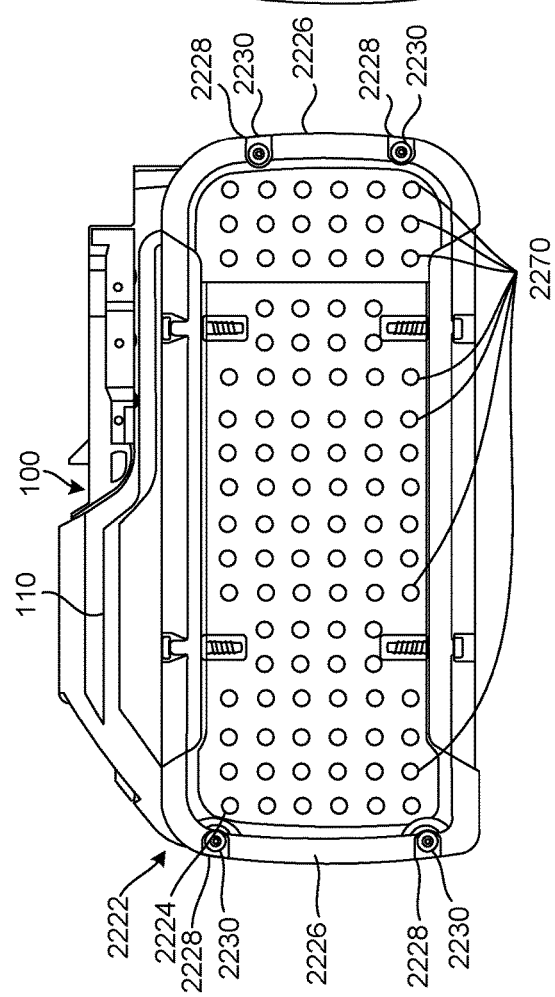
FIG. 22C is a perspective view of the side cover of the of the battery pack of FIG. 22B.

While this illustration shows just one side cover 2222, it is understood that the opposite side cover, which is not visible in this view, also includes an insert having multiple holes molded into the opposite side cover. FIG. 22C is a perspective view of the side cover 2222 of the of the battery pack 100 of FIG. 22B.

In the above examples illustrated in FIGS. 16A-22C, the inserts may be exposed to outer and inner surfaces of the battery pack. That is, in some implementations, the inserts may be fully encapsulated and molded into the plastic. In some implementations, the inserts or a portion of the inserts may be exposed to an outer surface of the battery pack. In some implementations, the inserts or a portion of the inserts may be exposed to an inner surface of the battery pack. In some implementations, the inserts or a portion of the inserts may be exposed to an outer surface of the battery pack and other inserts or a portion of the other inserts may be exposed to an inner surface of the battery pack.

Figure 23:
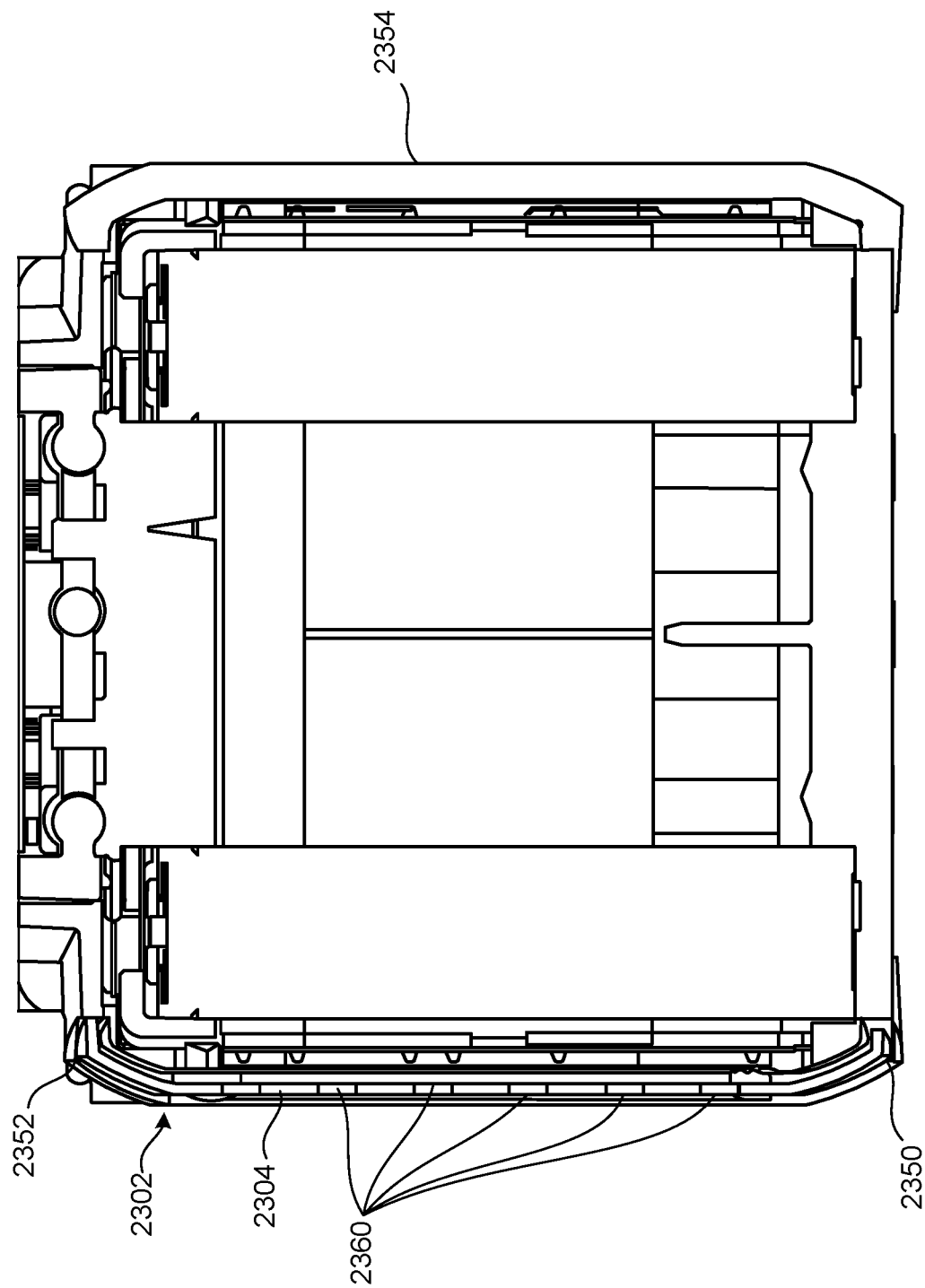
FIG. 23 is a cross-sectional view of the battery pack of FIG. 3 along a cross-section line D-D illustrating an insert having holes in a side cover of the battery pack.

FIG. 23 is a cross-sectional view of the battery pack of FIG. 3 along a cross-section line D-D illustrating an insert 2304 having holes 2360 in a side cover 2302 of the battery pack 100. The cross-sectional view is illustrative of any of the embodiments described and illustrated in FIGS. 20A-20B, 21A-21B and 22A-22B. The insert 2304 covers the height of the side cover 2302 from the bottom 2350 of the side cover 2302 to the top 2352 of the side cover. While not illustrated in this view, it is understood that the opposite side cover 2354 also may include an insert having multiple holes molded into the plastic.

Figure 25C:
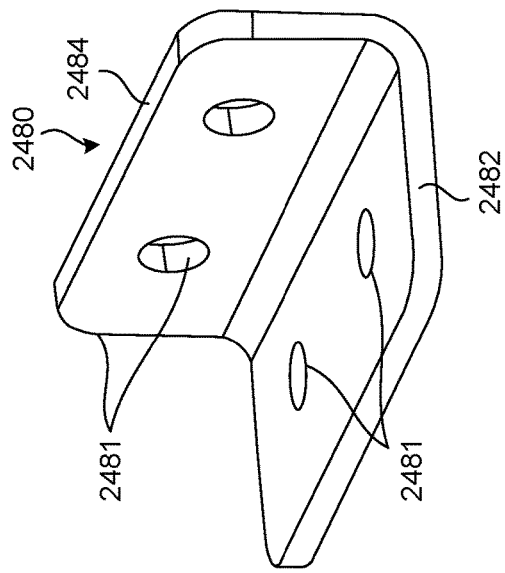
FIGS. 25A-25C are perspective views of an insert for a latch assembly mechanism.
Figure 25A:
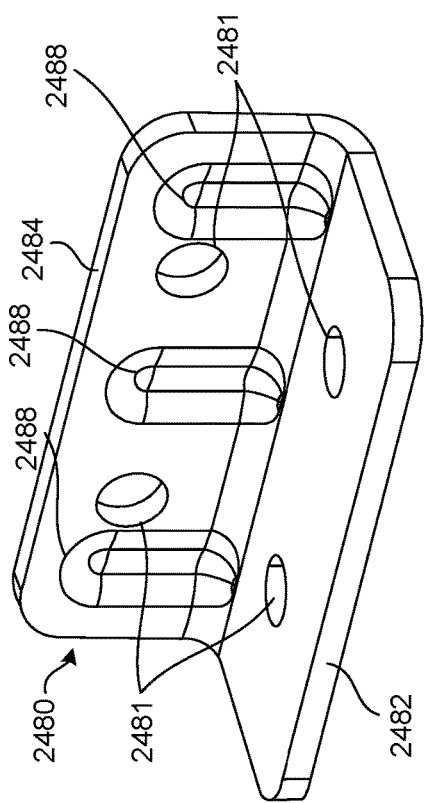
Figure 25B:
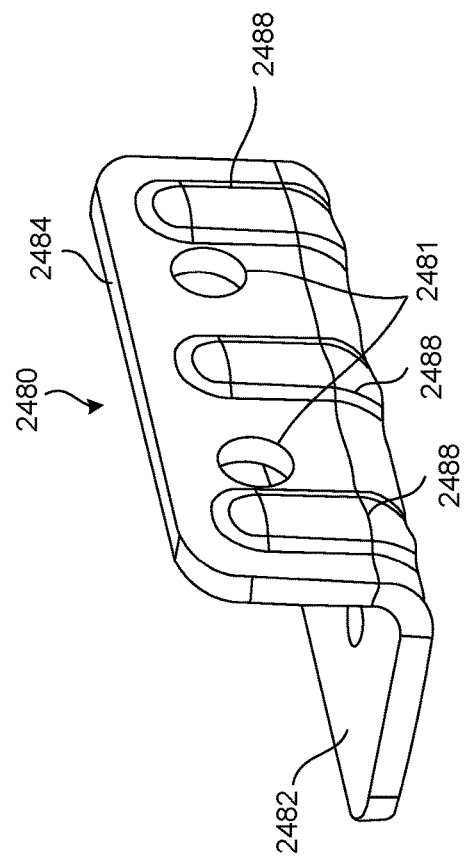

In some implementations, other components of the battery pack may include an insert that is molded into the plastic of the component. FIG. 24A is a side view of the engaging portion 2414 of the latch assembly mechanism having an insert 2480. The engaging portion 2414 includes the pivot arm 2434 and the pivot extension arm 2436. The engaging portion 2414 may include the insert 2480 that is molded into the engaging portion 2414 to strengthen and provide structural support for the engaging portion 2414. In some implementations, the insert 2480 is approximately L-shaped. In other implementations, the insert 2480 may be other shapes. As additionally illustrated in FIGS. 25A-25C, in some implementations, the insert 2480 includes a first portion 2482 and a second portion 2484. The insert 2480 may be one piece where the first portion 2482 bends at a 90 degree or greater angle to form the second portion 2484. In some implementations, the insert 2480 may include indentations 2488 to provide additional structural support. In this example, the indentations are illustrated on the second portion 2484; however, even though not illustrated the indentations also may be present on the first portion 2482.

The insert 2480 may include multiple holes 2481. The holes 2481 may assist in the molding process to enable the plastic to flow around the insert 2480 as the engaging portion 2414 is being formed.

FIG. 24B is a side view of another example alternate embodiment of the engaging portion 2414 of the latch assembly mechanism having an insert 2490. The insert includes a first portion 2492 and a second portion 2494 with an angle that is less than 90 degrees between the first portion 2492 and the second portion 2494.

In some implementations, at least a portion of the insert 2480 may be exposed on an outside surface of the engaging portion 2414. This may provide for a metal to plastic or metal to metal engagement between the exposed portion of the insert 2480 and a metal surface on a tool catch where the engaging portion mates with a piece of equipment.

The inserts for the latch may be made of different types of material. In some implementations, the inserts are made of metal. In some implementations, the metal inserts are made of steel. In some implementations, the metal inserts may be made of other types of metals, including combinations of metal types, that provide structural support and strength alongside the plastic material of the housing. In some implementations, the inserts are made of carbon fiber. In some implementations, the inserts are made of aluminium titanium. In some implementations, the inserts are made of other alloys. In some implementations, the inserts are increased plastic strength. For example, the insert for the latch may be made of a stronger plastic than the plastic materials that makes up the rest of the latch. The insert having the stronger plastic may be more impact rated while the other plastic for the rest of the latch could be rated for better wear resistance. In some implementations, the inserts are made of a metallic material.

Figure 26:
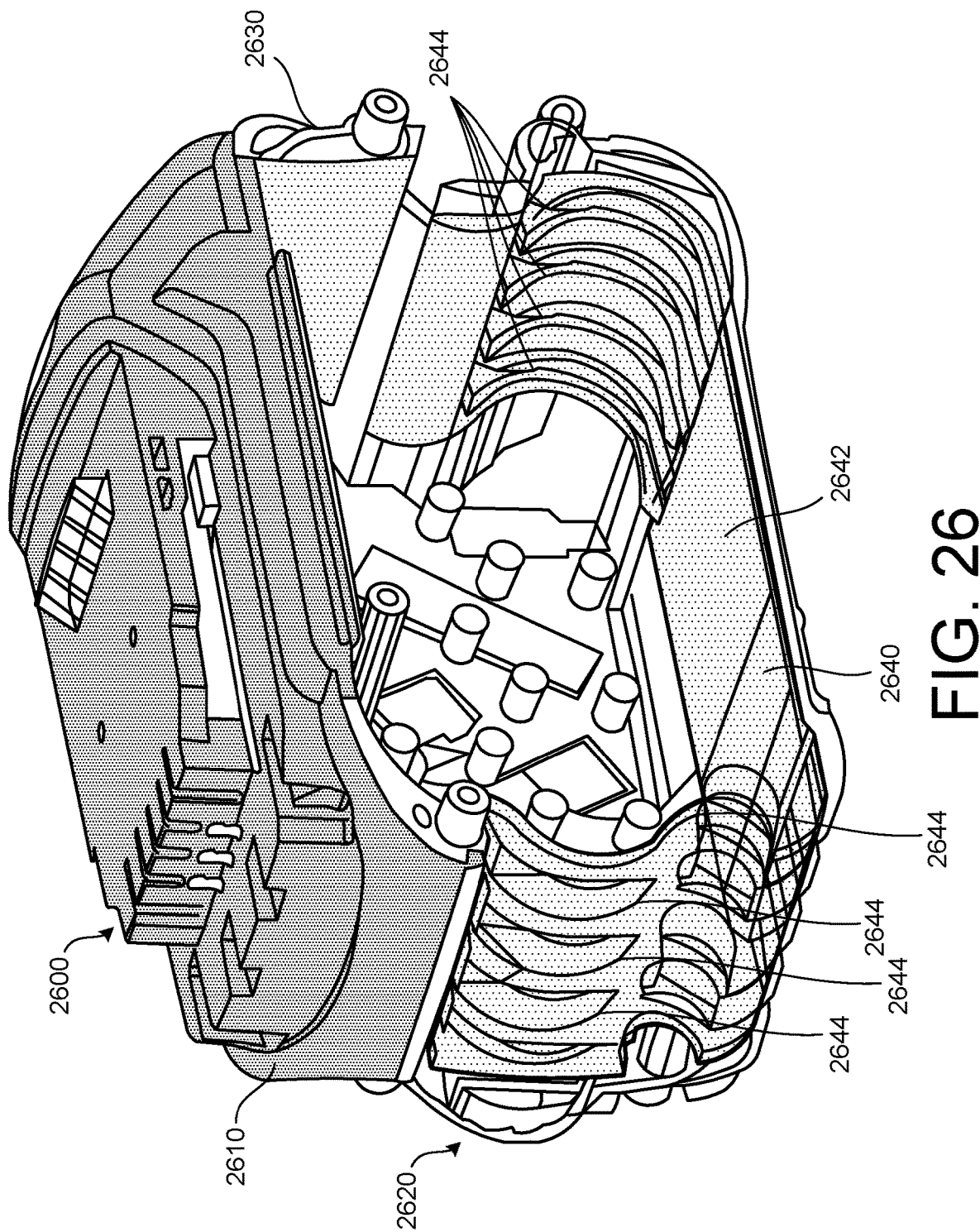
FIG. 26 is a perspective view of an alternate example embodiment of a battery pack housing illustrating a transparent view of the housing with multiple inserts.

FIG. 26 is a perspective view of a battery pack housing 2600 illustrating a transparent view of the housing 2600 with multiple inserts. The housing 2600 includes a top enclosure 2610 and a bottom enclosure 2620. In some implementations, both the top enclosure 2610 and the bottom enclosure 2620 include one or more inserts. For example, the top enclosure 2610 includes an insert 2630. The insert 2630 may be a solid insert piece that spans the width of the top enclosure 2610 and extends along at least a portion of the length of the top enclosure.

The bottom enclosure 2620 also includes an insert 2640. The insert 2640 includes a flat portion 2642 and multiple ribs 2644. In some implementations, the flat portion 2642 and the ribs 2644 may be all part of one insert. In some implementations, the flat portion 2642 and the ribs 2644 are separate components. The insert 2640 is molded into the plastic portion of the bottom enclosure 2620 to provide strength and structural support for the bottom enclosure 2620.

Figure 27:
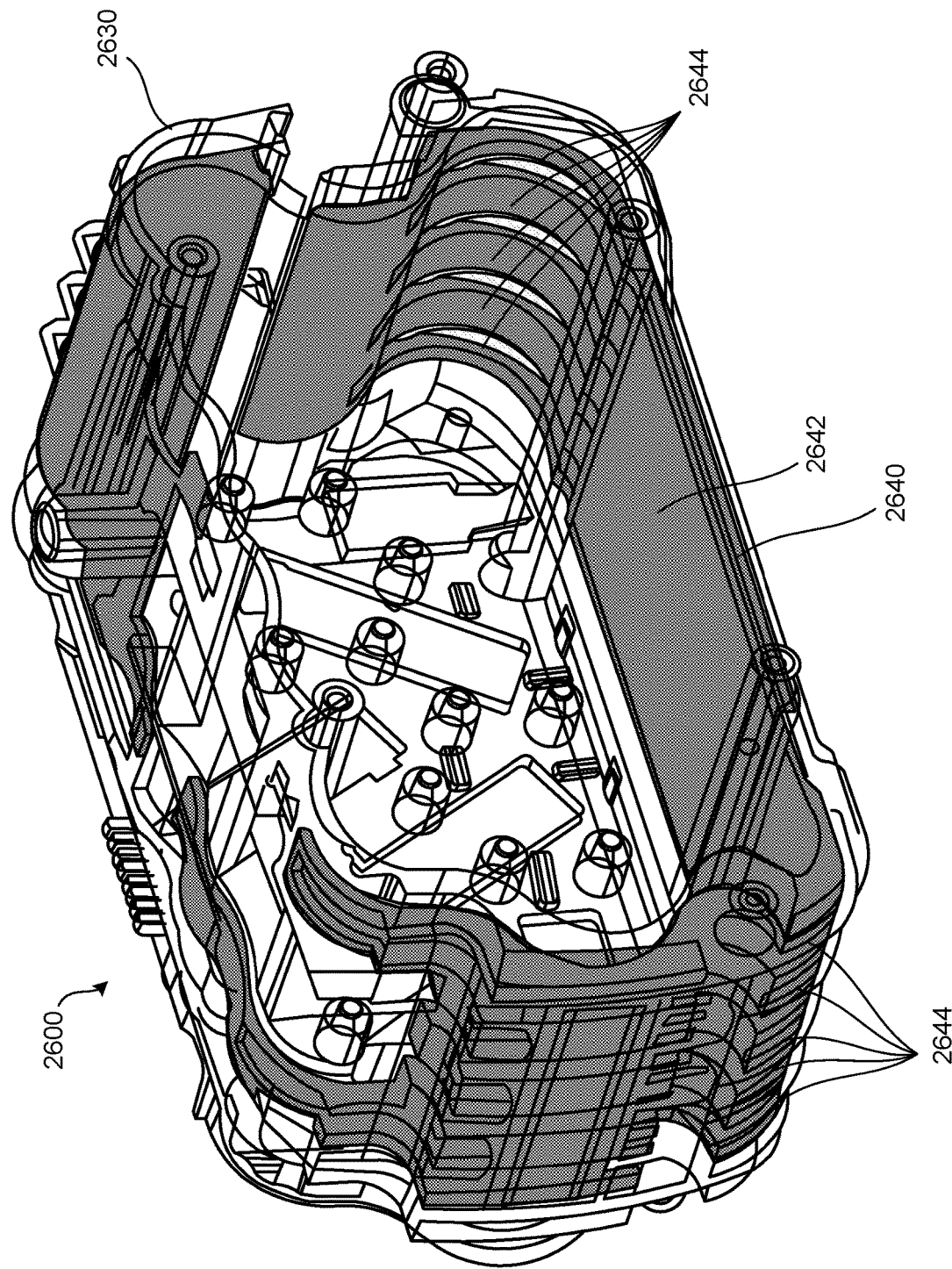
FIG. 27 is a perspective view of a battery pack housing illustrating a transparent view of the housing with multiple inserts.

FIG. 27 is a perspective view of a battery pack housing 2600 of FIG. 26 illustrating a transparent view of the housing with multiple inserts 2630 and 2640 with the top portion of the housing 2600 removed for clarity to better illustrate the inserts 2630 and 2640.

A battery pack includes a housing, a set of battery cells disposed in the housing, and a latch assembly mechanism. The latch assembly mechanism includes a user activation button that pivots about a first axis and an engaging portion that pivots about a second axis, where the first axis is parallel to the second axis and the user activation button actuates the engaging portion.

In some implementations, the battery pack further includes a spring disposed on a flat surface of the engaging portion.

In some implementations, the battery pack further includes a spring disposed between the engaging portion and an inside surface of a top of the housing.

In some implementations, the battery pack further includes a spring disposed between a spring support and a bottom surface of a flat portion of the engaging portion.

A battery pack includes a housing, a set of battery cells disposed in the housing, and a two-part latch assembly mechanism operable to mate and unmate the housing from a piece of equipment.

In some implementations, the two-part latch assembly includes a first part of the latch assembly mechanism that pivots about a first axis and a second part of the latch assembly mechanism that pivots about a second axis, where the first axis is parallel to the second axis.

In some implementations, the first part of the latch assembly mechanism includes a user activation button, a button extension, and a button extension arm and the second part of the latch assembly mechanism includes an engaging portion, a latch extension, and a latch extension arm, where the button extension arm interfaces with the latch extension arm and the user activation button actuates the engaging portion through the button extension arm interfacing with the latch extension arm.

In some implementations, the battery pack further includes a spring disposed on a flat surface of the engaging portion.

In some implementations, the battery pack further includes a spring disposed between the engaging portion and an inside surface of a top of the housing.

In some implementations, the battery pack further includes a spring disposed between a spring support and a bottom surface of a flat portion of the engaging portion.

In some implementations, the battery pack further includes a button pivot support, where the button extension arm includes a button pivot shoulder that is disposed on the button pivot support, the button pivot shoulder providing a rotation point for the first axis. The battery pack further includes a latch pivot support, where the latch extension arm includes a latch pivot shoulder that is disposed on the latch pivot support, the latch pivot shoulder providing a rotation point for the second axis.

A battery pack includes a housing. The housing includes a top portion, a first side portion connected to the top portion, a second side portion connected to the top portion, the second side portion opposite the first side portion, and a bottom portion connected to the first side portion and the second side portion, the bottom portion opposite the top portion, where an insert is molded into at least one of the first side portion and the second side portion. The battery pack includes a set of battery cells disposed in the housing.

In some implementations, the insert is a metal material.

In some implementations, the insert is a plastic material.

In some implementations, the insert is a carbon fiber material.

In some implementations, a first insert is molded into the first side portion and a second insert is molded into the second side portion.

In some implementations, a first insert is molded into the first side portion, a second insert is molded into the second side portion, and a third insert is molded into the bottom portion.

In some implementations, the first insert includes a single piece and the second insert includes a single piece.

In some implementations, the first insert includes two pieces and the second insert includes two pieces.

In some implementations, at least a portion of the first insert is exposed to an outer surface of the first side portion and at least a portion of the second insert is exposed to an outer surface of the second side portion.

In some implementations, the first insert includes multiple holes and the second insert includes multiple holes.

In some implementations, the first insert is fully encapsulated by plastic of the first side portion and the second insert is fully encapsulated by plastic of the second side portion.

In some implementations, the battery pack further includes a latch assembly mechanism, the latch assembly mechanism including an engaging portion with a latch insert molded into the engaging portion.

In some implementations, the latch insert includes a first portion and a second portion that form an L-shape.

In some implementations, the latch insert includes at least a portion that is exposed on an outside of the user engaging portion.

In some implementations, the latch insert is a metal material.

In some implementations, the latch insert is a plastic material.

In some implementations, the latch insert is a carbon fiber material.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A battery pack comprising:
a housing;
a set of battery cells disposed in the housing; and
a latch assembly mechanism, the latch assembly mechanism comprising:
a user activation button that pivots about a first axis, and an engaging portion that pivots about a second axis, wherein the first axis is parallel to the second axis and the user activation button actuates the engaging portion, and a spring disposed between the engaging portion and an inside surface of a top of the housing.

2. A battery pack comprising:
a housing;
a set of battery cells disposed in the housing; and
a latch assembly mechanism, the latch assembly mechanism comprising:
a user activation button that pivots about a first axis, and an engaging portion that pivots about a second axis, wherein the first axis is parallel to the second axis and the user activation button actuates the engaging portion, and a spring disposed between a spring support and a bottom surface of a flat portion of the engaging portion.

3. A battery pack comprising:
a housing;
a set of battery cells disposed in the housing; and
a multi-part latch assembly mechanism operable to mate and unmate the housing from a piece of equipment, wherein the multi-part latch assembly mechanism comprises:
a first part of the multi-part latch assembly mechanism that pivots on a first shoulder about a first axis; and
a second part of the multi-part latch assembly that pivots on a second shoulder about a second axis, wherein the first axis is parallel to the second axis,
the first part of the multi-part latch assembly mechanism including a user activation button, a button extension, and a button extension arm; and
the second part of the multi-part latch assembly mechanism including an engaging portion, a latch extension, and a latch extension arm,
the button extension arm interfacing with the latch extension arm and the user activation button actuating the engaging portion through the button extension arm interfacing with the latch extension arm, and
a spring disposed between the engaging portion and an inside surface of a top of the housing.

4. A battery pack comprising:
a housing;
a set of battery cells disposed in the housing; and
a multi-part latch assembly mechanism operable to mate and unmate the housing from a piece of equipment, wherein the multi-part latch assembly mechanism comprises:
a first part of the multi-part latch assembly mechanism that pivots on a first shoulder about a first axis; and
a second part of the multi-part latch assembly that pivots on a second shoulder about a second axis, wherein the first axis is parallel to the second axis,
the first part of the multi-part latch assembly mechanism including a user activation button, a button extension, and a button extension arm; and
the second part of the multi-part latch assembly mechanism including an engaging portion, a latch extension, and a latch extension arm,
the button extension arm interfacing with the latch extension arm and the user activation button actuating the engaging portion through the button extension arm interfacing with the latch extension arm, and
a spring disposed between a spring support and a bottom surface of a flat portion of the engaging portion.

5. The battery pack of claim 3, further comprising:
a button pivot support, wherein the button extension arm includes a button pivot shoulder that is disposed on the button pivot support, the button pivot shoulder providing a rotation point for the first axis; and
a latch pivot support, wherein the latch extension arm includes a latch pivot shoulder that is disposed on the latch pivot support, the latch pivot shoulder providing a rotation point for the second axis.

6. A battery pack comprising:
a housing;
a set of battery cells disposed in the housing; and
a latch assembly mechanism comprising a user activation button and an engaging portion, wherein the user activation button pivots on a first shoulder about a first axis to engage and cause the engaging portion to pivot on a second shoulder about a second axis, the second axis in closer proximity to the engaging portion than the first axis, and a spring disposed between the engaging portion and an inside surface of a top of the housing.

7. The battery pack of claim 6, wherein the housing includes: a first opening through which a portion of the user activation button is exposed external to the housing; and a second opening through which a portion of the engaging portion is exposed external to the housing.

8. The battery pack of claim 7, wherein the portion of the user activation button that is exposed external to the housing includes one or more raised ribs.

9. The battery pack of claim 7, wherein in response to the portion of the user activation button being depressed, the portion of the user activation button recedes into the first opening.

10. The battery pack of claim 9, wherein in response to the portion of the user activation button being depressed, the portion of the engaging portion recedes into the second opening.

11. The battery pack of claim 6, wherein the first axis is parallel to the second axis.

12. The battery pack of claim 6, wherein the spring is disposed on a flat surface of the engaging portion.

13. The battery pack of claim 6, wherein the spring is disposed between a spring support and a bottom surface of a flat portion of the engaging portion.

* * * * *